US010682902B2

(12) United States Patent
Otsuka et al.

(10) Patent No.: US 10,682,902 B2
(45) Date of Patent: Jun. 16, 2020

(54) PANEL-LIKE FORMED PRODUCT, VEHICLE DOOR, AND METHOD FOR MANUFACTURING A PANEL-LIKE FORMED PRODUCT

(71) Applicant: NIPPON STEEL & SUMITOMO METAL CORPORATION, Tokyo (JP)

(72) Inventors: Kenichiro Otsuka, Tokyo (JP); Yoshiaki Nakazawa, Tokyo (JP); Takeshi Kawachi, Tokyo (JP); Yoshiyuki Kaseda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 136 days.

(21) Appl. No.: 16/068,905

(22) PCT Filed: Jan. 27, 2017

(86) PCT No.: PCT/JP2017/003040
§ 371 (c)(1),
(2) Date: Jul. 10, 2018

(87) PCT Pub. No.: WO2017/131193
PCT Pub. Date: Aug. 3, 2017

(65) Prior Publication Data
US 2019/0009654 A1 Jan. 10, 2019

(30) Foreign Application Priority Data

Jan. 28, 2016 (JP) .................................. 2016-014849
Mar. 25, 2016 (JP) .................................. 2016-061873

(51) Int. Cl.
*B62D 25/04* (2006.01)
*B60J 5/04* (2006.01)
(Continued)

(52) U.S. Cl.
CPC ............ *B60J 5/0415* (2013.01); *B21D 22/02* (2013.01); *B21D 22/20* (2013.01); *B21D 22/208* (2013.01);
(Continued)

(58) Field of Classification Search
CPC ........ B01D 2253/102; B01D 2253/104; B01D 2253/108; B01D 2256/16;
(Continued)

(56) References Cited

U.S. PATENT DOCUMENTS

| | | | | |
|---|---|---|---|---|
| 4,838,606 A | * | 6/1989 | Furubayashi | .......... B60J 5/0444 256/73 |
| 6,843,519 B2 | * | 1/2005 | Ojanen | ................ B62D 29/008 296/37.6 |

(Continued)

FOREIGN PATENT DOCUMENTS

| | | |
|---|---|---|
| JP | 03-035825 | 2/1991 |
| JP | 2007-296953 | 11/2007 |

(Continued)

*Primary Examiner* — Kiran B Patel
(74) *Attorney, Agent, or Firm* — Clark & Brody LP

(57) ABSTRACT

The panel-like formed product includes a polygonal top board, two or more vertical walls, and a flange. The vertical walls extend from two or more sides of the top board, and include at least two adjacent vertical walls extending from at least two adjacent sides of the top board. The top board includes a frame portion, and a concave portion which is located at an inner side of the frame portion. The two or more adjacent vertical walls include a first vertical wall section, a stair, and a second vertical wall section. The stair connects to a lower end of the first vertical wall section. The second vertical wall section connects to an outer edge of the stair. The flange connects to a lower end of the second vertical wall section.

8 Claims, 13 Drawing Sheets

(51) Int. Cl.
  *B21D 22/20* (2006.01)
  *B21D 22/02* (2006.01)
  *B21D 47/00* (2006.01)
  *B21D 53/88* (2006.01)
(52) U.S. Cl.
  CPC ............. *B21D 47/00* (2013.01); *B21D 53/88* (2013.01); *B60J 5/0413* (2013.01)
(58) Field of Classification Search
  CPC .... B01D 2259/40026; E05Y 2900/106; E05Y 2900/132; E05Y 2900/531; E05D 15/24; E06B 3/485
  See application file for complete search history.

(56) References Cited

U.S. PATENT DOCUMENTS

| | | | | |
|---|---|---|---|---|
| 6,951,357 | B2 * | 10/2005 | Armstrong | B62D 33/023 296/191 |
| 7,124,541 | B2 * | 10/2006 | Fellner | B60J 5/0412 49/502 |
| 8,087,719 | B2 * | 1/2012 | Caliskan | B32B 3/266 296/191 |
| 8,136,862 | B2 * | 3/2012 | Bator | B62D 33/0273 296/57.1 |
| 8,136,866 | B2 * | 3/2012 | Broadhead | B60J 5/0416 296/146.2 |
| 9,403,421 | B2 * | 8/2016 | Sugiyama | B60J 5/0429 |
| 9,758,028 | B2 * | 9/2017 | Ikeda | B60K 1/04 |
| 2002/0158486 | A1 | 10/2002 | Dauvergne et al. | |
| 2002/0180236 | A1 * | 12/2002 | Blomeling | B60J 5/042 296/146.5 |
| 2004/0217623 | A1 * | 11/2004 | Chernoff | B60J 5/045 296/146.6 |
| 2015/0071812 | A1 * | 3/2015 | Kawano | C22C 38/00 420/103 |
| 2015/0108786 | A1 * | 4/2015 | Fisher | B60J 5/0488 296/146.5 |
| 2016/0152121 | A1 * | 6/2016 | Ikeda | B60J 5/101 49/501 |
| 2018/0001368 | A1 * | 1/2018 | Otsuka | B60J 5/04 |
| 2018/0264535 | A1 * | 9/2018 | Otsuka | B60J 5/0413 |
| 2019/0009828 | A1 * | 1/2019 | Nakazawa | B62D 25/2027 |
| 2019/0009829 | A1 * | 1/2019 | Shirakami | B62D 25/2018 |

FOREIGN PATENT DOCUMENTS

| | | |
|---|---|---|
| JP | 2008-094353 | 4/2008 |
| JP | 2011-173454 | 9/2011 |
| JP | 2013-112133 | 6/2013 |
| WO | 2014/084151 | 6/2014 |

* cited by examiner

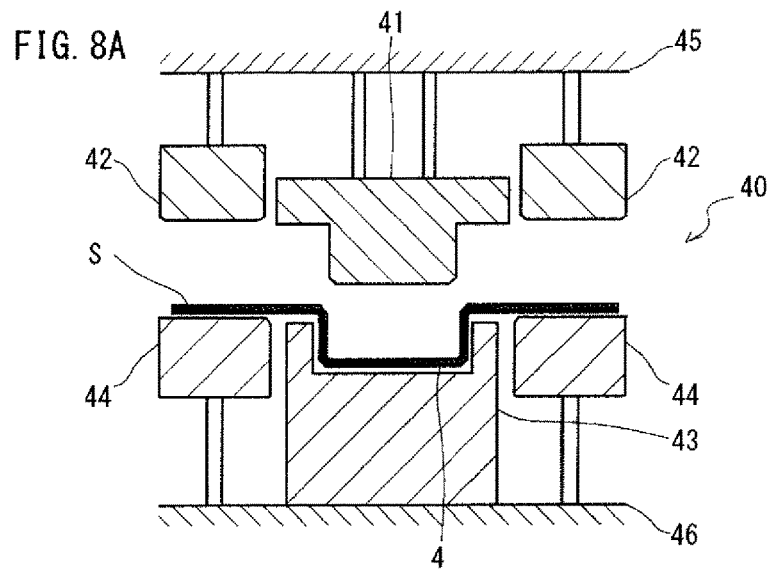
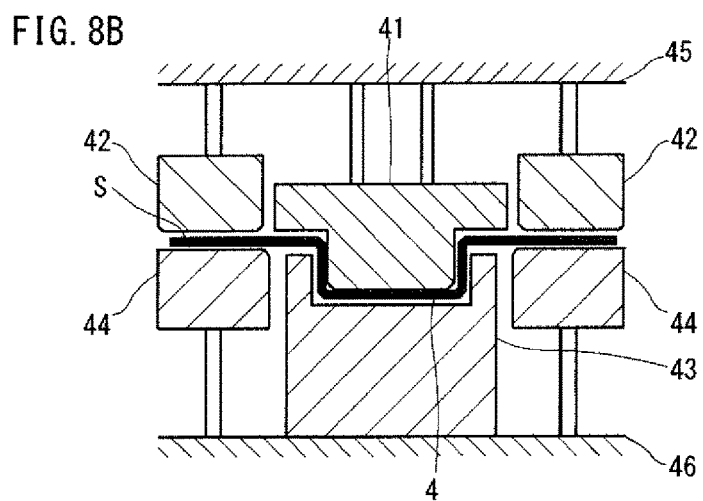
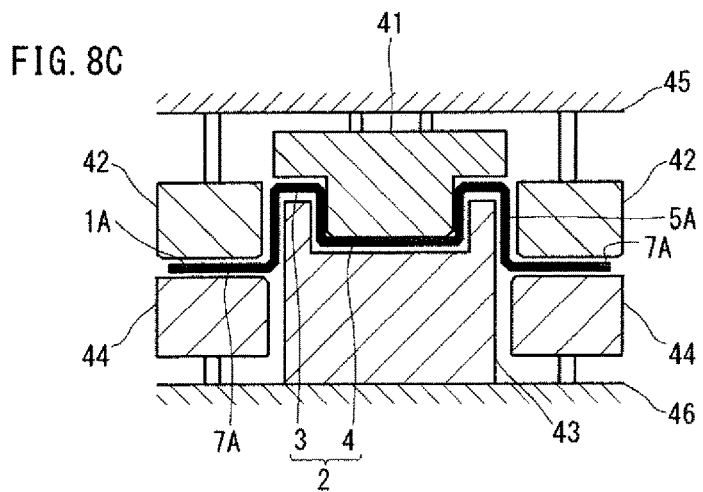

PANEL-LIKE FORMED PRODUCT, VEHICLE DOOR, AND METHOD FOR MANUFACTURING A PANEL-LIKE FORMED PRODUCT

TECHNICAL FIELD

The present invention relates to a panel-like formed product, a vehicle door, and a method for manufacturing a panel-like formed product. More specifically, the present invention relates to a panel-like formed product suited for use as a door inner panel for an automobile or any other vehicle, a vehicle door usable in an automobile or any other vehicle, and a method for manufacturing a panel-like formed product.

BACKGROUND ART

An automobile door is produced typically by fitting a door inner panel and a door outer panel together. A window, a window drive device, an audio speaker, a handle, and other various components are to be attached to the automobile door. For set-in of these components, a space must be made between the door inner panel and the door outer panel. In order to make the space, for example, vertical walls are made in the door inner panel. Also, when the door is closed, the inside of the automobile must be sealed by the door. In order to seal the inside of the automobile, for example, a stair is provided in the vertical walls of the door inner panel. The stair of the vertical walls is caused to face a pillar or the like of the vehicle body, and this ensures tight sealing of the inside of the automobile.

The door inner panel is produced by press working of a steel plate. Such a door inner panel generally has a complicated shape, and accordingly, in producing such a door inner panel, it is necessary to deform a steel plate largely. In this case, the door inner panel after the press working may have cracks, wrinkles, and the like. In order to suppress generation of cracks, wrinkles, and the like, usually, a soft steel plate with high workability is used as the material of the door inner panel.

However, the soft steel plate has low strength. Accordingly, a door inner panel formed of a soft steel plate has low strength. Therefore, a reinforcing member (for example, a beltline reinforcement, a door impact beam, and the like) is often attached to the door inner panel.

Door inner panels are disclosed, for example, in Japanese Patent Application Publication No. 2007-296953 (Patent Literature 1), Japanese Patent Application Publication No. 2008-94353 (Patent Literature 2) and Japanese Patent Application Publication No. 2013-112133 (Patent Literature 3).

The door inner panel disclosed in Patent Literature 1 includes a beltline reinforcement. The beltline reinforcement is attached to a beltline portion of the door inner panel and extends in the front-rear direction of the vehicle. Patent Literature 1 states that the beltline reinforcement bears a collision load applied to the vehicle in the vehicle front-rear direction, which effectively decreases the bending moment acting on the beltline portion.

In the door inner panel disclosed in Patent Literature 2, when a collision load is applied from a side of a vehicle, the door inner panel and the beltline reinforcement contact with each other, and a load absorbing portion of the door inner panel is deformed. Patent Literature 2 states that the load absorbing portion absorbs a part of a load applied in the thickness direction of the door inner panel, which ensures rigidity of the door inner panel.

In the side door disclosed in Patent literature 3, the rear end portion and the front end portion of a beltline reinforcement formed by hot stamping have strength and rigidity which are lower than those of the body of the beltline reinforcement. Accordingly, when a collision load is applied from the front side of the vehicle, the rear end portion of the beltline reinforcement is plastically deformed, and the contact area between the rear end portion of the beltline reinforcement and the center pillar increases. Patent Literature 3 states that the deformation of the rear end portion of the beltline reinforcement allows absorption of collision energy.

CITATION LIST

Patent Literatures

Patent Literature 1: Japanese Patent Application Publication No. 2007-296953

Patent Literature 2: Japanese Patent Application Publication No. 2008-94353

Patent Literature 3: Japanese Patent Application Publication No. 2013-112133

SUMMARY OF INVENTION

Technical Problems

Any of the door inner panels disclosed in Patent Literatures 1, 2 and 3 needs a separate reinforcing member, such as a beltline reinforcement or the like, to obtain a good collision property. Therefore, doors produced by using the door inner panels disclosed in Patent Literatures 1, 2 and 3 are low in production efficiency and high in cost.

An object of the present invention is to provide a panel-like formed product which has an excellent collision property, a vehicle door including the panel-like formed product, and a method for manufacturing the panel-like formed product.

Solutions to Problems

A panel-like formed product according to an embodiment of the present invention is made of a metal plate. The panel-like formed product includes a polygonal top board, two or more vertical walls, and a flange. The vertical walls extend from two or more sides of the top board among all sides of the top board defining an outer edge of the top board, and include at least two adjacent vertical walls extending from at least two adjacent sides of the top board. The flange connects to lower ends of the vertical walls and spreads in directions in which the top board spreads. The top board includes a frame portion and a concave portion. The frame portion includes the two or more sides of the top board from which the vertical walls extend. The concave portion is located at an inner side of the frame portion and recedes from the frame portion. The at least two adjacent vertical walls include a first vertical wall section, a stair, and a second vertical wall section. The stair connects to a lower end of the first vertical wall section and spreads in the directions in which the top board spreads. The second vertical wall section connects to an outer edge of the stair and extends in a direction in which the first vertical wall section extends. The flange connects to a lower end of the second vertical wall section.

A vehicle door includes the panel-like formed product, and a door outer panel, and a window member. The door outer panel is located in an outer portion of the vehicle, at an outer side of the panel-like formed product, and joined with the panel-like formed product. In this regard, the door outer panel is fastened to the flange of the panel-like formed product, and the concave portion of the panel-like formed product projects toward the door outer panel. The window member is capable of being housed in the concave portion, and the window member is located in an inner portion of the vehicle relative to the panel-like formed product.

A panel-like formed product manufacturing method according to an embodiment is a method for manufacturing a panel-like formed product made of a steel plate. The panel-like formed product to be manufactured has the above-described structure. The manufacturing method includes a preparing step of preparing a blank made of a steel plate; an intermediate pressing step of pressing the blank to form the top board and the first vertical wall section to a height of the stair and thereby producing an intermediate formed product; and a final pressing step of pressing the intermediate formed product by using a final pressing machine and thereby producing the panel-like formed product. The final pressing machine includes a center die including an end surface having a shape corresponding to a shape of a portion of the panel-like formed product from the top board to the outer edge of the stair; a blank holder located at an outer side of the center die and adjacent to the center die; a center punch facing the center die, the center punch including an end surface having a shape corresponding to a shape of a portion of the panel-like formed product from the top board to the stair; and an outer punch located at an outer side of the center punch and adjacent to the center punch to face the blank holder. The final pressing step includes: an early step of placing the intermediate formed product on the center die, and pinching the intermediate formed product between the center punch and the center die and further between the outer punch and the blank holder; and a late step of moving the outer punch and the blank holder with the intermediate formed product pinched in between relative to the center punch and the center die with the intermediate formed product pinched in between to form the second vertical wall section and the flange and thereby producing the panel-like formed product.

Advantage Effects of Invention

The panel-like formed product according to the present invention has an excellent collision property. The panel-like formed product manufacturing method according to the present invention allows production of a panel-like formed product which has an excellent collision property.

BRIEF DESCRIPTION OF DRAWINGS

FIG. 8A is a schematic view showing a step of a second intermediate pressing step which is carried out after the intermediate pressing step shown in FIGS. 7A to 7C.

FIG. 8B is a schematic view showing a step subsequent to the step shown in FIG. 8A.

FIG. 8C is a schematic view showing a step subsequent to the step shown in FIG. 8B.

DETAILED DESCRIPTION OF EMBODIMENTS

Figure 1:
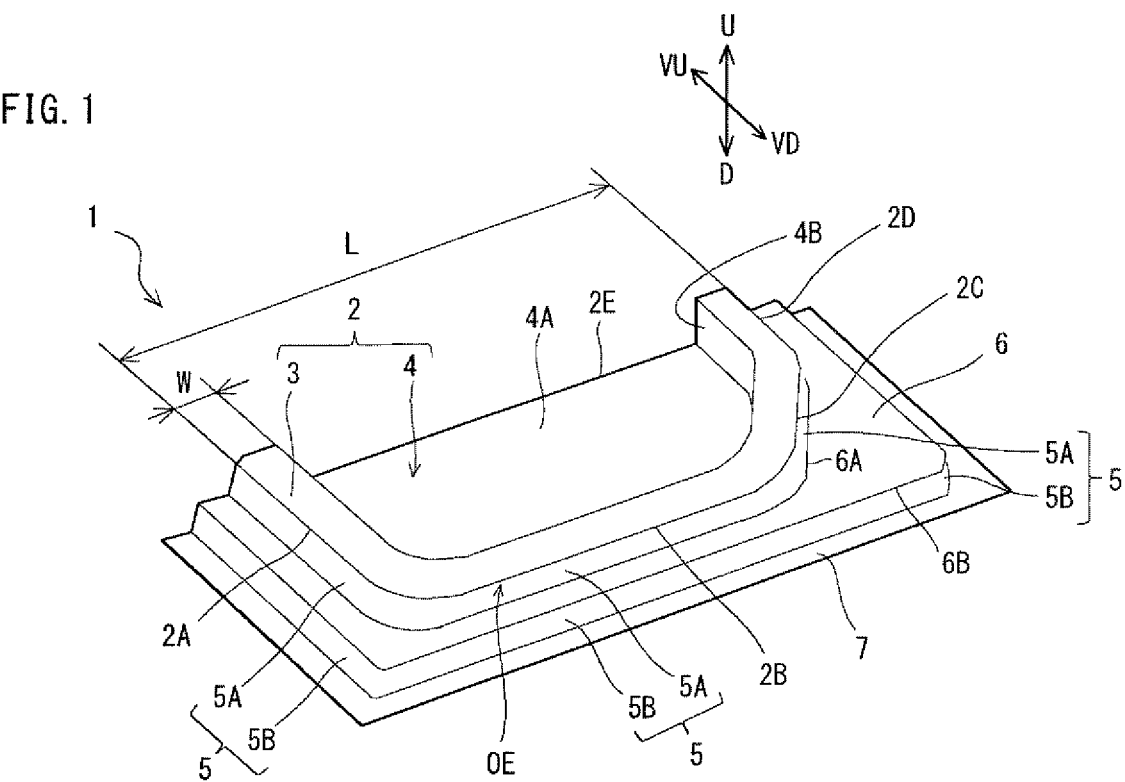
FIG. 1 is a perspective view of a panel-like formed product according to an embodiment of the present invention.

A panel-like formed product according to an embodiment of the present invention is formed of a metal plate. The panel-like formed product includes a polygonal top board, two or more vertical walls, and a flange. The vertical walls extend from two or more sides of the top board among all sides of the top board defining an outer edge of the top board, and include at least two adjacent vertical walls extending from at least two adjacent sides of the top board. The flange connects to lower ends of the vertical walls and spreads in directions in which the top board spreads. The top board includes a frame portion and a concave portion. The frame portion includes the two or more sides of the top board from which the vertical walls extend. The concave portion is located at an inner side of the frame portion and recedes from the frame portion. The at least two adjacent vertical walls include a first vertical wall section, a stair, and a second vertical wall section. The stair connects to a lower end of the first vertical wall section and spreads in the directions in which the top board spreads. The second vertical wall section connects to an outer edge of the stair and extends in a direction in which the first vertical wall section extends. The flange connects to a lower end of the second vertical wall section.

Thus, the panel-like formed product according to the embodiment includes a concave portion in the top board. The concave portion improves the collision property of the panel-like formed product. For example, when the panel-like formed product is combined with an outer panel or the like, the product made by the combination has an excellent collision property. Specifically, when the outer panel or the like is deformed by a collision load, the deformed outer panel or the like hits against the concave portion of the panel-like formed product. Then, the concave portion absorbs the collision energy. The panel-like formed product according to the present invention has an excellent collision property, and accordingly, the product in which the panel-like formed product is used has an excellent collision property.

The panel-like formed product may be formed by cold pressing, warm pressing or hot pressing. The panel-like formed product may be produced by applying hot stamping to an intermediate formed product having a portion already formed into the portion of the panel-like formed product from the top board to the stair.

In the panel-like formed product, the frame portion may have a width W (mm) which satisfies a condition expressed by formula (1), in which L denotes a maximum width (mm) of the top board.

$$10 < W < 0.2 \times L \qquad (1)$$

When the width W of the frame portion of the panel-like formed product satisfies the condition expressed by formula (1), the concave portion is sufficiently large. Accordingly, the concave portion can absorb large collision energy. Therefore, the collision property of the panel-like formed product is further improved.

In the panel-like formed product, the distance between the frame portion and a bottom face of the concave portion may be greater than the distance between the frame portion and the stair.

In this case, when the panel-like formed product is combined with an outer panel and the like to produce a vehicle door, the distance between the concave portion of the panel-like formed product and the outer panel is short. In other words, the panel-like formed product is positioned near the outer panel. Accordingly, the concave portion of the panel-like formed product hits against the outer panel and the like at an early stage of collision. Thereby, the collision property of the vehicle door is further improved.

The metal plate which is the material of the panel-like formed product may be a steel plate. In this case, the steel plate has a tensile strength of desirably not less than 340 MPa, more desirably not less than 600 MPa and still more desirably not less than 1200 MPa.

In this case, the plate thickness of the panel-like formed product can be made thinner, and the concave portion can substitute for a beltline reinforcement, a door impact beam or any other reinforcing member. This leads to a further weight reduction of the panel-like formed product.

The concave portion of the top board further may include either a linear depression depressed into the bottom face of the concave portion or a linear projection projecting from the bottom face of the concave portion, or both. Specifically, the concave portion of the top board may include a depression and no projection. The concave portion of the top board may include a projection and no depression. The concave portion of the top board may include both a depression and a projection. Here, "linear" means being like a straight line, like a curved line or like a wavy line. When the concave portion of the top board includes a plurality of linear depressions and/or projections, the plurality of linear depressions and/or projections may cross each other.

The metal plate which is the material of the panel-like formed product may be a tailored blank. In this case, it is possible to heighten the strength of only a specified portion, which allows a reduction in plate thickness.

The panel-like formed product may be used as a door inner panel of an automobile or any other vehicle. In this case, none of the vertical walls and the frame portion extends from a side to be positioned at an upper side in the vehicle, among all sides of the top board defining the outer edge of the top board.

When the panel-like formed product is used as a door inner panel of an automobile or any other vehicle, the vehicle door includes a door outer panel and a window member as well as the panel-like formed product. The door outer panel is located in an outer portion of the vehicle, at an outer side of the panel-like formed product, and joined with the panel-like formed product. In this regard, the door outer panel is fastened to the flange of the panel-like formed product in such a way that the concave portion of the panel-like formed product projects toward the door outer panel. The window member is capable of being housed in the concave portion of the panel-like formed product, and is located in an inner portion of the vehicle, at an inner side of the panel-like formed product.

In this case, when a collision load is applied to the outer panel of the vehicle door, the concave portion of the panel-like formed product hits against the door outer panel at an early stage. Accordingly, the collision property of the vehicle door is improved.

The window member is a transparent member, and for example, a window glass. The window member may be made of transparent resin.

A panel-like formed product manufacturing method according to an embodiment of the present invention is a method for manufacturing a panel-like formed product by using a steel plate as a material. The panel-like formed product has the above-described structure. The manufacturing method includes a preparing step, an intermediate pressing step, and a final pressing step. In the preparing step, a blank made of a steel plate is prepared. In the intermediate pressing step, the blank is pressed to form the top board and the first vertical wall section to a height of the stair, and thereby an intermediate formed product is produced. In the final pressing step, the intermediate formed product is pressed by using a final pressing machine to produce the panel-like formed product. The final pressing machine includes a center die, a blank holder, a center punch, and an outer punch. The center die includes an end surface having a shape corresponding to a shape of a portion of the panel-like formed product from the top board to the outer edge of the stair. The blank holder is located at an outer side of the center die and adjacent to the center die. The center punch faces the center die, and the center punch includes an end surface having a shape corresponding to the shape of the portion of the panel-like formed product from the top board to the outer edge of the stair. The outer punch is located at an outer side of the center punch and adjacent to the center punch, and faces the blank holder. The final pressing step includes an early step and a late step. In the early step, the intermediate formed product is placed on the center die, and the intermediate formed product is pinched between the center punch and the center die and further between the outer punch and the blank holder. In the late step, the outer punch and the blank holder with the intermediate formed product pinched in between is moved relative to the center punch and the center die with the intermediate formed product pinched in between to form the second vertical wall section and the flange, and thereby the panel-like formed product is produced.

In the panel-like formed product manufacturing method according to the embodiment, the panel-like formed product is manufactured in two-stage pressing including an intermediate pressing step and a final pressing step. Thereby, even a panel-like formed product having a difficult-to-form shape can be manufactured while generation of wrinkles and cracks is suppressed during the pressing. Here, a difficult-to-form shape means such a shape of the panel-like formed product as described above in which a stair is made in adjacent vertical walls.

The manufacturing method may further include a heating step of heating the intermediate formed product to be executed before the final pressing step. In this case, in the final pressing step, the heated intermediate formed product is pressed and quenched, and thereby, the panel-like formed product is produced. In this case, the early step of the final pressing step includes a first step and a second step. In the first step, the heated intermediate formed product is placed on the center die and pinched between the center punch and the center die, and the outer punch is brought into contact with the intermediate formed product. In the second step, after the outer punch is brought into contact with the intermediate formed product, while the intermediate formed product is kept pinched between the center punch and the center die, the blank holder is brought into contact with the intermediate formed product to pinch the intermediate formed product between the outer punch and the blank holder.

In this case, the blank holder does not make contact with the intermediate formed product until the outer punch makes contact with the intermediate formed product at the first step. After the outer punch makes contact with the intermediate formed product, the blank holder makes contact with the intermediate formed product at the second step. Therefore, a temperature drop of the intermediate formed product before the start of pressing, which is caused by contact with the blank holder, can be suppressed. Consequently, hot stamping can be carried out in the final pressing while the intermediate formed product keeps workability.

In the first step, the blank holder may be positioned such that the end surface of the blank holder is at a height lower than a height of a stair portion of the end surface of the center die corresponding to the stair of the panel-like formed product.

In the manufacturing method, the steel plate may be a tailored blank.

A panel-like formed product, a vehicle door, and a method for manufacturing a panel-like formed product according to some embodiments of the present invention will hereinafter be described in reference to the drawings. In the drawings, the same parts and members are provided with the same reference symbols, and the same descriptions will not be repeated.

In the following description of the embodiments, a door inner panel for an automobile side door will be described as an example of a panel-like formed product. However, panel-like formed products are not limited to door inner panels for automobile side doors. Panel-like formed products may be, for example, door inner panels for rear doors and any other doors as well as side doors. Also, panel-like formed products are not limited to door inner panels. Panel-like formed products are usable as members required to have a good collision property.

In reference to FIG. 1, a panel-like formed product 1, which is a door inner panel, includes a top board 2, vertical walls 5, and a flange 7. In the following description of the panel-like formed product 1, the direction from the flange 7 toward the top board 2 will be referred as an upward direction (indicated by arrow U in FIG. 1), and the direction from the top board 2 toward the flange 7 will be referred to as a downward direction (indicated by arrow D in FIG. 1). Further, in FIG. 1, arrow VU and arrow VD indicate the upward direction and the downward direction, respectively, of a vehicle in which the panel-like formed product 1 is used as a door inner panel.

In reference to FIG. 1, the material of the panel-like formed product is a metal plate. The panel-like formed product 1 is made by press forming the metal plate, for example.

In FIG. 1, the metal plate used as the material of the panel-formed product 1 has a substantially constant plate thickness. Accordingly, the plate thickness of the entire panel-formed product 1 is substantially constant. However, the plate thickness of the panel-formed product 1 may be varied in some degree due to the press forming. The plate thickness of the panel-like formed product 1 is 0.3 to 2.3 mm, for example.

The top board 2 of the panel-like formed product 1 is polygonal. The top board 2 may be quadrangular or pentagonal, for example. The top board 2 may be in the shape of a polygon having more than five sides. In this description, "polygon" includes a polygonal shape having round corners (corners and vertexes with a radius of curvature, for example). FIG. 1 shows an example in which the top board 2 is pentagonal.

The top board 2 includes a frame portion 3 and a concave portion 4. The frame portion 3 extends along the outer edge OE of the top board 2 in at least a part of the outer edge OE. The frame portion 3 includes some of the sides of the top board 2 defining the outer edge OE which connect to the vertical walls 5. In FIG. 1, the frame portion 3 includes sides 2A to 2D, among the sides 2A to 2E defining the outer edge OE, and the sides 2A to 2D connect to the vertical walls 5. On the side 2E, which is a part of the outer edge OE and is located farthest in the vehicle upward direction (indicated by arrow VU), no frame portion 3 and no vertical wall 5 are formed. The side 2E defines what is called a beltline.

The concave portion 4 is located in an inner portion of the top board 2, at the inner side of the frame portion 3, and recedes from the frame portion 3. The concave portion 4 includes a bottom face 4A and a side surface 4B. The concave portion 4 is to heighten an impact property against external force (impact) applied mainly from the up-down direction of the panel-like formed product (mainly from the direction indicated by arrow U in FIG. 1). This will be described later. The top board 2 shown in FIG. 1 does not include any through-holes or other openings. However, the top board 2 may have through-holes and other openings. When the top board 2 has an opening, the opening may be to receive any member fitted therein or alternatively to attain a weight reduction of the panel-like formed product 1.

The vertical walls 5 extend from two or more of all the sides of the top board 2 defining the outer edge OE of the top board 2. The vertical walls 5 extend in a direction crossing directions in which the top board 2 spreads. In FIG. 1, the vertical walls 5 extends in the downward direction of the panel-like formed product 1 (in the direction indicated by arrow D) which is perpendicular to the directions in which the top board 2 spreads. In other words, the vertical walls 5 extend perpendicularly to the top board 2. However, the vertical walls 5 need not extend in the direction perpendicular to the directions in which the top board 2 spreads and need not extend perpendicularly to the top board 2.

The upper ends of the vertical walls 5 connect to the corresponding sides 2A to 2D. In FIG. 1, the vertical walls 5 extend downward from the sides 2A to 2D. However, it is only necessary that the vertical walls 5 extend at least two adjacent sides of all the sides defining the outer edge OE of the top board 2.

As described above, in the panel-like formed product 1 to be used as a door inner panel, none of the frame portion 3 and the vertical walls 5 extends from the side 2E of the top board 2. This is because the side 2E will be an entry/exit for a window member when the panel-like formed product 1 is incorporated in a side door as a door inner panel.

At least two adjacent vertical walls of the vertical walls 5 include a first vertical wall section 5A, a stair 6 and a second vertical wall section 5B. Thus, the vertical walls 5 including the stair 6 has a stair-like shape.

The first vertical wall section 5A and the second vertical wall section 5B extend in a direction crossing the directions in which the top board 2 spreads. The first vertical wall section 5A and the second vertical wall section 5B may be and need not be parallel to each other. The first vertical wall section 5A may be and need not be perpendicular to the top board 2. The second vertical wall section 5B may and need not be perpendicular to the top board 2.

The stair 6 spreads in the directions in which the top board 2 spreads. The stair 6 has an inner edge 6A connecting to the lower end of the first vertical wall section 5A. The stair 6 has an outer edge 6B connecting to the upper ends of the second vertical wall section. The stair 6 shown in FIG. 1 has a substantially flat surface. However, the surface of the stair 6 need not be strictly flat and may have asperities in some degree. The directions in which the stair 6 spreads may be and need not be parallel to the directions in which the top board 2 spreads. Preferably, the curvatures of the asperities of the surface of the stair 6 are less than 0.01.

The flange 7 connects to the lower end of the second vertical wall section 5B of the vertical walls 5. The flange 7 spreads in the directions in which the top board 2 spreads. The direction in which the flange 7 spreads may be and need not be parallel to the direction in which the top board 2 spreads.

In FIG. 1, four adjacent vertical walls 5 are in a stair-like shape and include a stair 6. In the case shown in FIG. 1, there are three pairs of adjacent vertical walls 5 (a pair formed of the vertical wall 5 connecting to the side 2A and the vertical wall 5 connecting to the side 2B, a pair formed of the vertical wall 5 connecting to the side 2B and the vertical wall 5 connecting to the side 2C, and a pair formed of the vertical wall 5 connecting to the side 2C and the vertical wall 5 connecting to the side 2D), and these three pairs of vertical walls 5 include the stair 6. However, the number of pairs of vertical walls 5 including the stair 6 is not limited to three. In the panel-like formed product 1, it is only necessary that at least one of the pairs of adjacent vertical walls (that is, at least two adjacent vertical walls 5) includes the stair 6.

In the case shown in FIG. 1, the stair-like vertical walls 5 include only one stair 6. However, the number of stairs 6 is not limited to one, and the stair-like vertical walls may include a plurality of stairs 6. In other words, the vertical walls 5 may be in a stair-like shape including a plurality of stairs. In this case, the lower end of the second vertical wall section 5B connects to the inner edge of the flange 7, and the upper end of the second vertical wall section 5B connects to the outer edge of the bottom stair 6. The inner edge of the bottom stair 6 connects to the lower end of the first vertical wall section 5A. Above the first vertical wall section 5A, the other parts of the stairs (at least one other stair and other vertical walls) are formed.

The top board 2 of the panel-like formed product 1 according to the present invention, as mentioned above, includes a concave portion 4, which recedes from the edge 3, at the inner side of the edge 3. Because of the concave portion 4, the panel-like formed product 1 has an excellent collision property. This will be described below.

Figure 2:
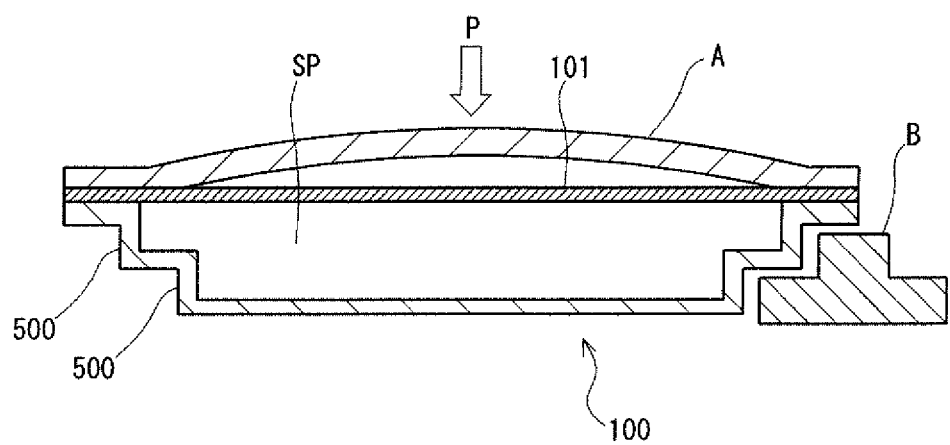
FIG. 2 is a sectional view of a vehicle door in a plane perpendicular to an up-down direction of a vehicle.

FIG. 2 is a sectional view of a standard automobile side door along a line perpendicular to the vehicle up-down direction. The side door is produced by fitting a door inner panel A and a door outer panel 100 together. A space SP is formed between the door outer panel A and the door inner panel 100. In the space SP, an audio speaker, a window, a window drive device, and the like are set.

When the automobile has a side-impact crash, a load P (indicated by an outlined arrow in FIG. 2) is applied to the door outer panel A. Then, the door outer panel A is deformed by the load P, and the vertical wall 500 of the inner panel 100 is deformed. The deformation of the vertical wall 500 of the door inner panel 100 absorbs the collision energy by the load P. Therefore, in order to improve the collision property of the side door, it is necessary to improve the collision property of the door inner panel.

However, the conventional door inner panel 100 is made of a soft steel plate with low strength. The reason is as follows. As described above, the door inner panel has a complicated shape, and it is difficult to press a steel plate with high strength into the shape of the door inner panel 100. A soft steel plate has a tensile strength of not more than 330 MPa, for example. Therefore, in a conventional automobile side door made of a soft steel plate, usually, a reinforcing member 101, which is a different part from the door inner panel 100, is disposed between the door outer panel A and the door inner panel 100, as shown in FIG. 2. Thereby, the collision property of the side door is improved. The reinforcing member 101 is, for example, a beltline reinforcement, a door impact beam, or the like.

In reference to FIG. 2, in the side door with the reinforcing member 101, when the door outer panel A is deformed inward by the load P, the deformed door outer panel A first hits against the reinforcing member 101. Accordingly, the collision energy is absorbed by the reinforcing member 101 in addition to by the door inner panel 100. Thus, the collision property of the side door is improved.

Figure 3:
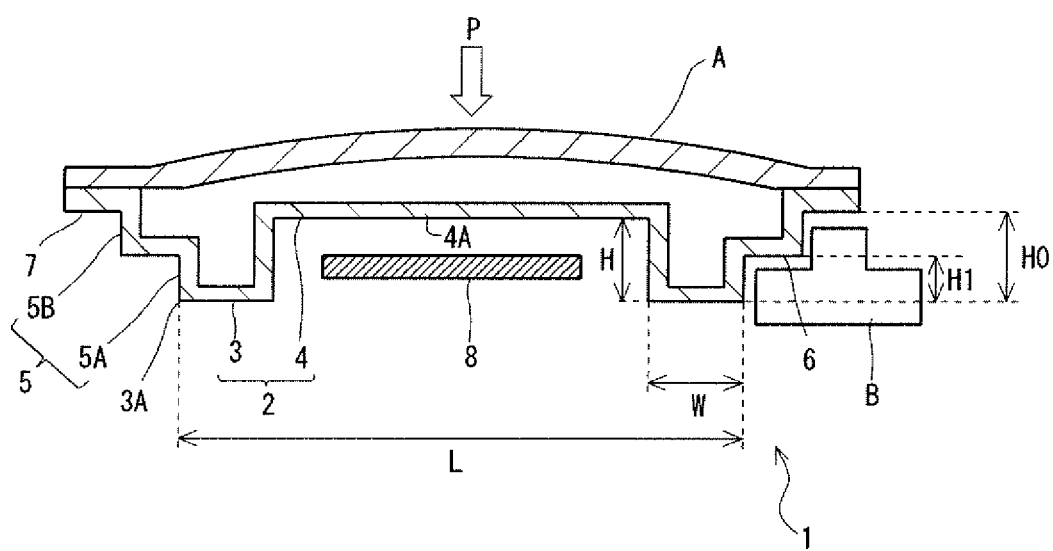
FIG. 3 is a sectional view of a vehicle door including the panel-like formed product shown in FIG. 1 as a door inner panel in a plane perpendicular to an up-down direction of the vehicle.

On the other hand, when the panel-like formed product 1 according to the embodiment is employed in a vehicle door as a door inner panel, it is possible to improve the collision property of the vehicle door without using the reinforcing member 101. FIG. 3 is a sectional view of a vehicle door, in which the panel-like formed product 1 according to the embodiment is employed, along a line perpendicular to the vehicle up-down direction. FIG. 3 shows a case in which the vehicle door is a side door to be attached to a side of a vehicle.

In reference to FIG. 3, the vehicle door includes the panel-like formed product 1 employed as a door inner panel, a door outer panel A, and a window member 8. The window member 8 is a transparent member, and for example, is a window glass. The window member 8 may be made of transparent resin, for example.

The door outer panel A is located in an outer portion of the vehicle, at the outer side of the panel-like formed product 1. The panel-like formed product 1 is located in an inner portion of the vehicle, at the inner side of the door outer panel A. The panel-like formed product 1 is joined with the door outer panel A. Specifically, the flange 7 of the panel-like formed product 1 is joined with the door outer panel A. In this regard, the concave portion 4 of the panel-like formed product 1 projects toward the door outer panel A. The window member 8 is positioned such that at least a part of the window member 8 can be housed in the concave portion 4.

As described above, in the panel-like formed product 1, the concave portion 4 receding from the edge 3 is formed in the top board 2. Accordingly, when the panel-like formed product 1 is joined with the door outer panel A, the bottom face 4A of the concave portion 4 is positioned near the door outer panel A as shown in FIG. 3. Therefore, when the door outer panel A is deformed inward by collision, the door outer panel A hits against the concave portion 4. Then, the collision energy is absorbed not only by the vertical walls 5 but also by the concave portion 4. Hence, the panel-formed product 1 is difficult to deform, and the collision property of the panel-formed product 1 and the side door is improved.

Thus, the concave portion 4 of the panel-like formed product 1 according to the embodiment can substitute for the reinforcing member 101 shown in FIG. 2. Therefore, the side door with the panel-like formed product 1 has an excellent collision property though not having the reinforcing member 101.

The material of the panel-like formed product 1 shown in FIG. 1 is a steel plate. However, the material of the panel-like formed product 1 is not limited to a steel plate and may be any other metal plate. The metal plate usable as the material is, for example, a plate of aluminum, an aluminum alloy, titanium, magnesium, or the like.

The shape of the panel-like formed product is complicated as described above. Therefore, when the panel-like formed product 1 is made of a steel plate by a conventional pressing method, wrinkles and other defects are likely to be generated. However, by adopting a manufacturing method as described below, it is possible to manufacture the panel-like formed product 1 while suppressing generation of wrinkles and other defects. Further, by carrying out hot stamping as described below, it is possible to manufacture a panel-like formed product 1 with a tensile strength of not less than 600 MPa, and preferably not less than 1200 MPa, from a steel plate. Accordingly, the concave portion 4 can fully substitute for the reinforcing member 101. For reference, when a final pressing step to be described later is carried out as cold pressing, the panel-like formed product 1 made of a steel plate has a tensile strength of not less than 340 MPa, for example.

When the material of the panel-like formed product according to the present invention is a steel plate, it is preferred that the microstructure of the steel plate includes martensite. More desirably, the microstructure of the steel plate includes martensite as a base. As mentioned above, the tensile strength of the steel plate is desirably not less than 600 MPa, and more desirably not less than 1200 MPa. The Vickers hardness of the steel plate is desirably not less than HV180, and more desirably not less than HV380. The tensile strength is measured in conformity with JIS Z 2241 (2011), and the Vickers hardness is measured in conformity with JIS Z 2244 (2009).

Here, the sentence, "the microstructure of the steel plate includes martensite as a base" means that the microstructure of the steel plate includes martensite at 70% or more in area ratio. The area ratio of martensite in the microstructure is desirably not less than 80%, more desirably not less than 90%, still more desirably 95%, and most desirably 100%. The martensite in the microstructure may be tempered martensite. By adjusting the area ratio of martensite in the microstructure and the tempering condition (tempering temperature) appropriately by a conventional method, it is possible to cause the panel-like formed product to have a tensile strength of not less than 600 MPa.

When the material of the panel-like formed product is a steel plate, the steel plate has a chemical composition, for example, including, in mass %, C: 0.11 to 0.50%, Si: 0.15 to 0.25%, Mn: 0.08 to 1.50%, B: 0 to 0.0030, and Cr: 0 to 0.25%. The chemical composition may, for example, include, in mass %, C: 0.11 to 0.50%, Si: 0.15 to 0.25%, Mn: 0.08 to 1.50%, B: 0 to 0.0030%, and Cr: 0 to 0.25%, the balance being Fe and impurities. The steel plate may contain either B: 0.0020 to 0.0030% or Cr: 0.15 to 0.25%, or both.

As described above, the microstructure of the steel plate used as the material of the panel-like formed product includes martensite. The microstructure is formed by hot stamping. The steel plate usable as the material of the panel-like formed product does not necessarily have the above-described chemical composition, and any steel plate is usable as long as it has a microstructure including martensite.

When the panel-like formed product 1 is used as a door inner panel, typically, the panel-like formed product 1 has the following dimensions.

Entire length (including the flange 7): 800 to 1300 mm
Entire width (including the flange 7): 600 to 800 mm
Entire length of the top board 2: 700 to 1200 mm
Entire width of the top board 2: 500 to 700 mm
Height of the first vertical wall section 5A: 30 to 100 mm
Height of the second vertical wall section 5B: 30 to 100 mm
Minimum width of the stair: 20 to 40 mm
Plate thickness of the material steel plate: 0.3 to 2.3 mm (preferably 0.5 to 1.8 mm)

The frame portion 3 of the panel-like formed product 1 preferably has a width W (unit: mm, see FIG. 1) which satisfies the condition expressed by the following formula (1), in which L denotes the maximum width (mm) of the top board 2. The maximum width L of the top board 2 (including the frame portion 3 and the concave portion 4) means the largest distance among every distance between any two points on the outer edge OE of the top board 2.

$$10 < W < 0.2 \times L \tag{1}$$

When the panel-like formed product 1 is used as a door inner panel of an automobile side door, the maximum width L of the top board 2 is the dimension of the top board 2 in the vehicle front-rear direction.

When the width W of the frame portion 3 is greater than 10 mm, the frame portion 3 is wide enough. Accordingly, the strength of the vertical walls 5, including the strength of the frame portion 3, is high, and the vertical walls 5 are unlikely to fall when a collision load is applied thereto. When the width W of the frame portion 3 is less than 0.2×L, the concave portion 4 is large enough. In this case, the concave portion 4 sufficiently absorbs the collision energy and fully substitutes for the reinforcing member 104. The width W of the frame portion 3 is preferably as small as possible within the range expressed by the formula (1). Also, the width W of the frame portion 3 is preferably constant across the entire length. This is to ensure a sufficient area for the concave portion 4 of the top board 2.

In reference to FIG. 3, the distance H between the frame portion 3 and the bottom face 4A (which corresponds to the height of the side surface 4B and will hereinafter be also referred to as the height of the concave portion 4) is preferably greater than the distance H1 between the frame portion 3 and the stair 6 (which will hereinafter be referred to as the height of the stair 6). In this case, when the panel-like formed product 1 is used in a side door, the bottom face 4A of the concave portion 4 is positioned near the door outer panel A. Accordingly, when the door outer panel A is deformed inward of the vehicle by impact, the concave portion 4 hits against the door inner panel A at an early stage. Therefore, when the panel-like formed product 1 is used as a door inner panel, the collision property of the door is improved.

In reference to FIG. 3, the distance H0 between the surface of the frame portion 3 and the surface of the flange 7 is defined as the entire height H0 of the panel-like formed product 1. In this case, the height H1 (mm) of the stair 6 satisfies the condition expressed by the following formula (2).

$$0.25 \times H0 < H1 < H \quad (2)$$

When the panel-like formed product 1 is used as a door inner panel, the stair 6 faces a pillar B or the like of the vehicle body and seals the inside of the vehicle (see FIG. 3). In order to seal the inside of the vehicle tighter, a sealing member is provided between the stair 6 and the pillar B or the like.

When the height H1 of the stair 6 is sufficiently greater than $0.25 \times H0$, a sufficient height is secured for the second vertical wall section 5B. In this case, a sufficient area is secured for the sealing member to be attached to the second vertical wall section 5B, and the inside of the vehicle can be sealed tighter.

The position of the concave portion 4 is preferably as close as possible to the door outer panel A. As shown in FIG. 3, the window member 8 is set in an inner portion of the vehicle, at the inner side of the panel-like formed product 1, and is housed in the concave portion 4 of the panel-like formed product 1. Accordingly, as shown in FIG. 3, the bottom face 4A of the concave portion 4 intervenes between the door outer panel A and the window member 8.

The structure of the side door in which the panel-like formed product 1 is used is not limited to the structure shown in FIG. 3. The window member 8 and other parts may be disposed between the panel-like formed product 1 and the door outer panel A. The height H of the concave portion 4 is determined in consideration of the material and the workability of the workpiece to be subjected to forming. Then, the position of the window member 8 is determined in consideration of the height H of the concave portion 4.

Figure 4:
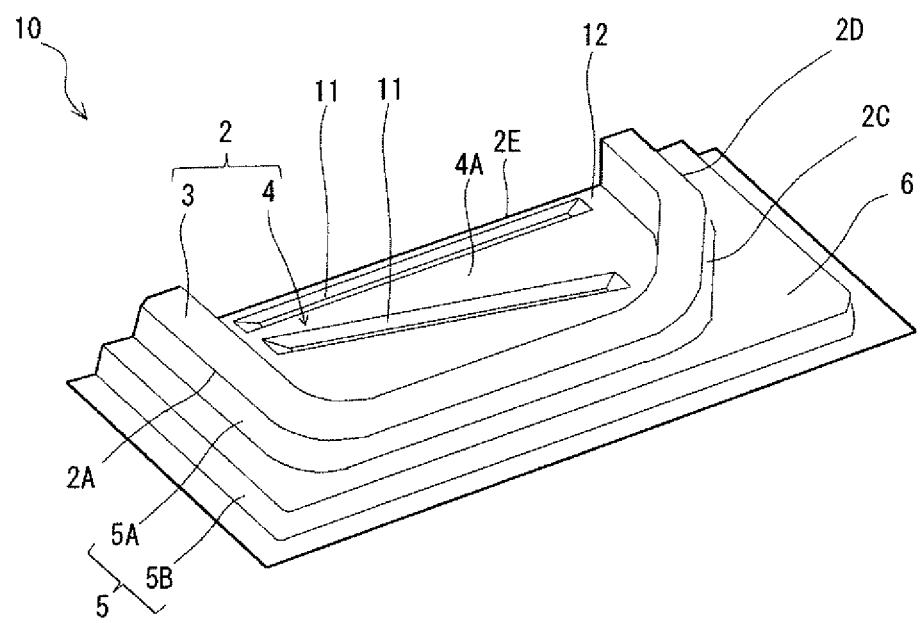
FIG. 4 is a perspective view of a panel-like formed product which is different from the panel-like formed product shown in FIG. 1.

FIG. 4 is a perspective view of another panel-like formed product 10 according to the embodiment which is different from the panel-like formed product shown in FIG. 1. In reference to FIG. 4, the panel-like formed product 10 includes a concave portion 4 as the panel-like formed product 1, and the panel-like formed product 10 further includes one or more depressions 11 in the bottom face 4A of the concave portion 4.

The depression 11 is, for example, formed linearly in the bottom face 4A of the concave portion 4. The "linearly" means in the shape of a straight line, a curved line, a wavy line, or the like. There are no other differences in structure between the panel-like formed product 10 and the panel-like formed product 1 shown in FIG. 1. The panel-like formed product 10 with the depression 11 in the bottom face 4A of the concave portion 4 will hereinafter be described.

When the depression 11 is formed in the bottom face 4A, the bottom face 4A with the depression 11 increases in second moment of area. In other words, the depression 11 increases the strength of the concave portion 4 of the panel-like formed product 10. Accordingly, the concave portion 4 with the depression 11 absorbs more collision energy. It is especially preferred that the depression 11 is formed in a vehicle upper area 12 including the beltline (side 2E) of the concave portion 4 (the vehicle upper area hereinafter being referred to as a "beltline area"), along the beltline area 12. In other words, the depression 11 is formed in the bottom face 4A, preferably near and along the side 2E defining the beltline. In this case, when the panel-like formed product 1 is used as a door inner panel, the beltline is reinforced. Thus, the depression 11 functions as a beltline reinforcement.

As shown in FIG. 4, the depression 11 may be formed in the bottom face 4A of the concave portion 4, diagonally from the side 2E defining the beltline. In this case, the depression 11 reinforces the entire bottom face 4A of the concave portion 4. A projection may be formed on the bottom face 4A of the concave portion 4 instead of the depression 11. Both the depression 11 and the projection may be formed. The depression 11 and/or the projection formed in/on the bottom face 4A of the concave portion 4 increase the second moment of area of the concave portion 4.

As an example of a panel-like formed product according to the embodiment, a side door inner panel has been described. However, the panel-like formed product according to the embodiment is not limited to a side door inner panel. The panel-like formed product according to the embodiment can be used as a door inner panel for a rear door or any other door as well as a side door. The panel-like formed product according to the embodiment is not limited to a door inner panel. The panel-like formed product can be used as a member which is required to have a high collision property. Such a member is usable in an automobile, a railcar, a self-propelled construction machine, a self-propelled agricultural machine, a self-propelled industrial machine, an air vehicle, or the like, and is especially suited for use as a door of such a vehicle.

In the above-described embodiment, the steel plate used as the material of the panel-formed product 1 may be a tailored blank. Tailored blanks are generally classified into tailored welded blanks (which will hereinafter be referred to also as "TWB"s) and tailored rolled blanks (which will hereinafter be referred to also as "TRB"s). A TWB is produced by joining different kinds of steel plates which are different in plate thickness, tensile strength, etc. together by welding (for example, by butt welding). A TRB is a steel plate with various plate thicknesses produced by use of reduction rolls arranged at irregular intervals. By using a tailored blank, it is possible to increase the strength of only a desired part, and it is possible to decrease the plate thickness. A panel-like formed product made of a tailored blank is suited for use as a vehicle door inner panel. Thereby, the collision property can be improved, and a further weight reduction can be expected.

As described above, the panel-like formed product 1 according to the embodiment includes a concave portion 4 in the top board 2, at the inner side of the frame portion 3. Because of the concave portion 4, the panel-like formed product 1 has a shape into which a conventional door inner panel and a conventional reinforcing member as typified by a door impact beam are unified. Therefore, the panel-like formed product 1 has an excellent collision property with no need to provide a door impact beam and any other reinforcing member 101.

It is preferred that the panel-like formed product according to the embodiment has high strength. The tensile strength of the panel-like formed product is desirably not less than 600 MPa and more desirably not less than 1200

MPa. When the panel-like formed product has higher tensile strength, the door inner panel using the panel-like formed product can absorb more collision energy. However, when a steel plate is used as the material of the panel-like formed product, it is difficult to produce a high strength panel-like formed product by press forming. When a high-strength steel plate is used as the material, the high-strength steel plate has low workability, and therefore, it is difficult to form the panel-like formed product 1 with a complicated shape by press forming.

However, by adopting a panel-like formed product manufacturing method according to an embodiment as described below, it is possible to produce a panel-like formed product 1 with high strength even when using a steel plate as the material. An exemplary method for manufacturing a panel-like formed product from a steel plate will be described below.

[Manufacturing Method]

A manufacturing method according to an embodiment of the present invention includes a preparing step, an intermediate pressing step, a heating step, and a final pressing step. According to the embodiment, hot stamping is carried out in the final pressing step. The respective steps will be described. However, when the final pressing step is executed as cold pressing, the heating step is not carried out. The case in which the final pressing step is executed as cold pressing will be described later.

[Preparing Step]

In the preparing step, a planar blank made of a steel plate is prepared. There is no particular limit to the chemical composition of the steel plate as a blank as long as a microstructure including martensite is formed therein by hot stamping which will be described below. The chemical composition preferably contains carbon (C) at not less than 0.11% in weight percent. When the steel plate contains C at not less than 0.11%, the panel-like formed product after the hot stamping step will have high strength. The steel plate more desirably has a chemical component as described above in connection with the panel-like formed product 1.

The steel plate as a blank may be a surface-treated steel plate. The surface-treated steel plate is, for example, a zinc-plated steel plate with a zinc plating on the surface. The blank may have an opening and need not have an opening.

Intermediate Pressing Step

Figure 5:
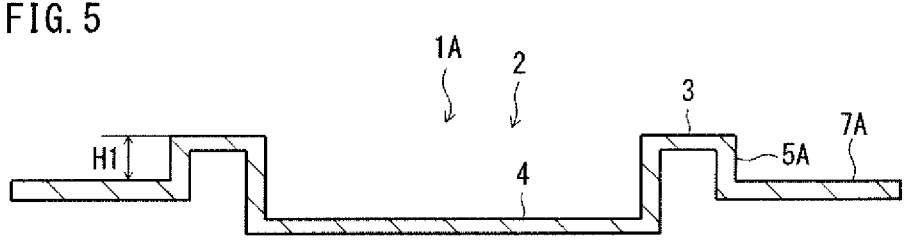
FIG. 5 is a sectional view of an intermediate formed product which is an intermediate product of the panel-like formed product.

In the pressing step, the blank is subjected to cold, warm, or hot pressing, and thereby, an intermediate formed product 1A as shown in FIG. 5 is produced.

As show in FIG. 5, in the intermediate formed product 1A, as compared with the panel-like formed product 1, the top board 2 has been formed, and the first vertical wall section 5A has been formed to a height H1 of an intermediate flange 7A which corresponds to the stair C. Specifically, the intermediate formed product 1A includes a top board 2, a first vertical wall section 5A, and an intermediate flange 7A. The first vertical wall section 5A is located between the top board 2 and the intermediate flange 7A. A first end of the first vertical wall section 5A connects to the outer edge of the top board 2, and a second end thereof connects to the intermediate flange 7A. The first vertical wall section 5A extends in a direction crossing the directions in which the top board 2 spreads. The intermediate flange 7A spreads from the second end of the first vertical, wall section 5A in the directions in which the top board spreads. The intermediate flange 7A may be and need not be parallel to the direction in which the top board 2 spreads. The distance from the surface of the frame portion 3 to the surface of the intermediate flange 7A is equal to the distance H1 from the surface of the frame portion 3 to the surface of the stair 6 in the panel-like formed product 1.

The first vertical wall section 5A corresponds to the first vertical wall section 5A of the panel-like formed product 1 as a final product. The intermediate flange 7A includes the stair 6 of the panel-like formed product 1 as a final product. Thus, the intermediate formed product 1A is an intermediate product obtained in the middle of production of the panel-like formed product 1 and before forming of the second vertical wall section 5B, the stair 6 and the flange 7.

In the intermediate pressing step, first, a concave portion 4 is formed in the blank (first intermediate pressing step). Next, while the concave portion 4 is pinched by dies, the frame portion 3, the first vertical wall section 5A and the intermediate flange 7A are formed (second intermediate pressing step). In the intermediate pressing step, the blank is pressed such that the top board 2 is formed and such that the vertical wall section 5A is formed to the height of the stair 6, and thereby, the intermediate formed product 1A is produced.

In producing the intermediate formed product 1A, in the second intermediate pressing step, while the concave portion 4 is pinched and held between dies (a punch and a die), the first vertical wall section 5A and the flange 7A are formed. This reduces the risk of causing wrinkles and other defects due to press forming. Two embodiments (a first embodiment and a second embodiment) of the intermediate pressing step will be described below. In the first embodiment, the first and the second intermediate pressing steps are carried out by use of the same dies (a punch and a die). In the second embodiment, different dies (punches and dies) are used in the first intermediate pressing step and in the second intermediate pressing step. The respective embodiments will be described below.

First Embodiment

Figure 6A:
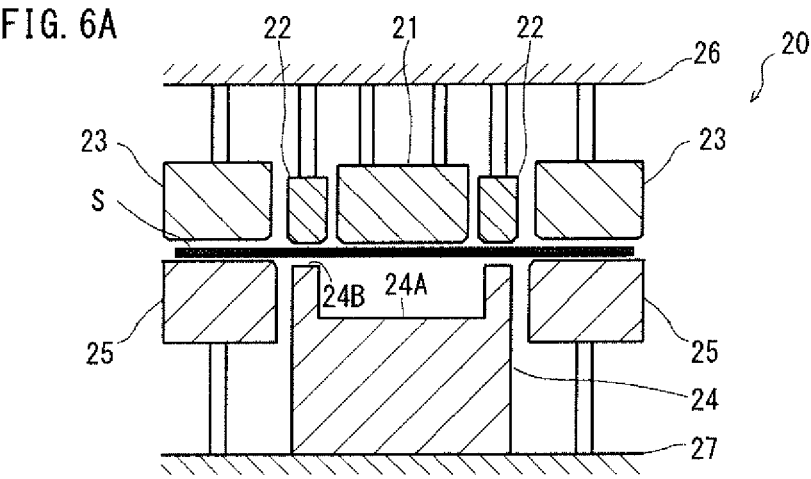
FIG. 6A is a schematic view showing a step of an intermediate pressing step.
Figure 6B:
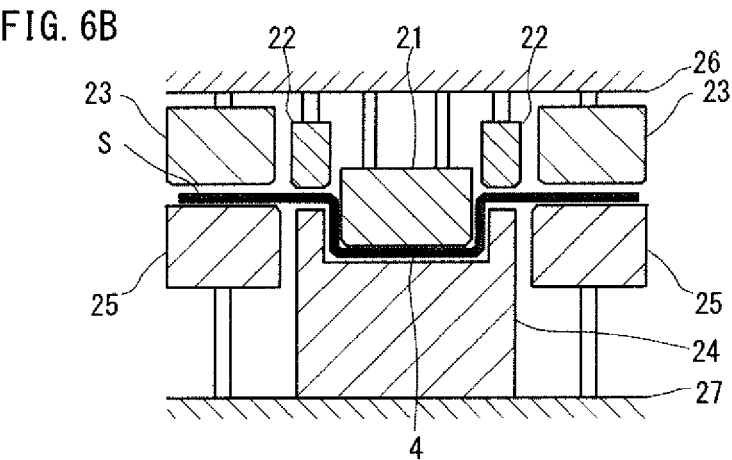
FIG. 6B is a schematic view showing a step subsequent to the step shown in FIG. 6A.
Figure 6C:
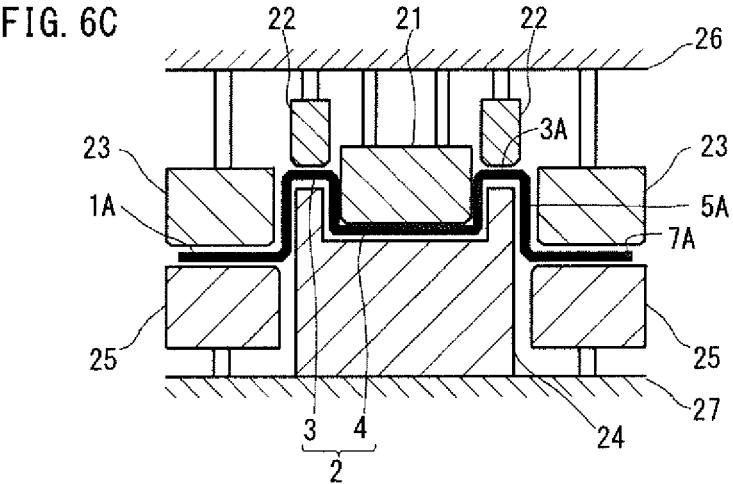
FIG. 6C is a schematic view showing a step subsequent to the step shown in FIG. 6B.

FIGS. 6A to 6C are sectional views schematically showing an intermediate pressing step according to the first embodiment. FIG. 6A shows a step of placing a blank S in an intermediate pressing machine 20 (blank placing step). FIG. 6B shows a step of forming the concave portion 4 by pressing (first intermediate pressing step). FIG. 6C shows a step of forming the first vertical wall section 5A and the intermediate flange 7A by pressing (second intermediate pressing step).

In the intermediate pressing step according to the first embodiment, the intermediate pressing machine 20 shown in FIG. 6A is used. The intermediate pressing machine 20 includes a center punch 21, an intermediate punch 21 and an outer pinch 23 as upper dies, and includes a center die 24 and a blank holder 25 as lower dies. The upper dies engage with the lower dies.

The punch end surface (end surface to press the blank S for forming) of the center punch 21 has a shape corresponding to the concave portion 4 of the intermediate formed product 1A. Specifically, the punch end surface and a nearby part of the side surface of the center punch 21 have shapes corresponding to the shapes of the bottom face and the side surface of the concave portion 4.

The center punch 22 is located at the outer side of the center punch 21 and at the inner side of the outer punch 23. The punch end surface of the intermediate punch 22 has a shape corresponding to the shape of the frame portion 3 of the top board 2. There is a clearance between the intermediate punch 22 and the center punch 21.

The outer punch 23 is located at the outer side of the intermediate punch 22 and adjacent to the intermediate punch 22. There is a clearance between the outer punch 23 and the intermediate punch 22.

The die end surface (end surface to contact the blank S) of the center die 24 faces the punch end surface of the center punch 21 and the punch end surface of the intermediate punch 22. The die end surface of the center die 24 has a shape corresponding to the shape of the top board 2. Specifically, the die end surface of the center die 24 includes a concave portion 24A corresponding to the concave portion 4 and a frame portion 24B corresponding to the frame portion 3.

The blank holder 25 is located at the outer side of the center die 24 and adjacent to the center die 24. There is a clearance between the blank holder 25 and the center die 24. The end surface of the blank holder 25 faces the punch end surface of the outer punch 23. The blank holder 25 is used to form the first vertical wall section 5A and the intermediate flange 7A.

In reference to FIG. 6A, the center punch 21, the intermediate punch 22 and the outer punch 23 are supported by an upper holder 26. The center punch 21, the intermediate punch 22 and the outer punch 23 are movable (movable up and down) relative to one another. For example, a pressing member (not shown) may be disposed between the intermediate punch 22 and the upper holder 26, and a pressing member (not shown) may be disposed between the outer punch 23 and the upper holder 26. The pressing members are, for example, hydraulic cylinders, gas cylinders, springs, rubber members, or the like.

Only one pressing member may be provided for the vertical motions of the intermediate punch 22 and the outer punch 23 relative to the center punch 21, or alternatively separate pressing members may be provided for the intermediate punch 22 and the outer punch 23, respectively, as described above. A pressing member (not shown) may be disposed between the center punch 21 and the upper holder 26. There is no particular limit to the mechanism for vertical motions of the center punch 21, the intermediate punch 22 and the outer punch 23 as long as it allows these punches to move up and down independently of one another and relative to one another.

The center die 24 and the blank holder 25 are supported by a lower holder 27. The blank holder 25 is movable up and down relative to the center die 24. For example, a pressing member (not shown) is disposed between the blank holder 25 and the lower holder 27. The pressing member may be as described above.

The upper holder 26 is fastened to a lifting and lowering device (slide) (not shown). The lifting and lowering device is driven to move up or down the upper holder 26. The lower holder 27 is fastened to a bolster plate (not shown).

The intermediate pressing machine 20 are not limited to the structure shown in FIG. 6A as long as it includes the center punch 21, the intermediate punch 22, the outer punch 23, the center die 24 and the blank holder 25. For example, the center punch 21, the intermediate punch 22 and the outer punch 23 may be fastened to separate slides which are independently movable up and down.

The intermediate pressing step by use of the intermediate pressing machine 20 will be described in detail below. First, as shown in FIG. 6A, the planar blank S is placed between the upper dies and the lower dies of the intermediate pressing machine 20. In this regard, the punches are positioned such that the punch end surface of the upper center punch 21, the punch end surface of the intermediate punch 22 and the punch end surface of the outer punch 23 are substantially on the same level with one another. In other words, the punch end surfaces of the punches 21 to 23 are positioned to be substantially at the same height with one another. Similarly, the frame portion 24B of the center die 24 and the end surface of the blank holder 25 are positioned to be substantially on the same level with each other. In other words, the frame portion 24B of the center die 24 and the end surface of the blank holder 25 are positioned to be substantially at the same height with each other. Accordingly, the blank S is placed on the center die 24 and the blank holder 25 to contact the frame portion 24B of the center die 24 and the end surface of the blank holder 25.

Next, the first intermediate pressing step is carried out. Specifically, the lifting and lowering device (slide) is driven to lower the upper holder 26. For example, the punches 21 to 23 are lowered with the end surfaces of the punches 21 to 23 kept at the same height with one another until the punches 21 to 23 make contact with the upper surface of the blank S.

The upper holder 26 is lowered, and the center punch 21, the intermediate punch 22 and the outer punch 23 make contact with the upper surface of the blank S. Then, the blank S is pinched and held between the punch end surface of the center punch 21 and the frame portion 24B of the center die 24. The blank S is also pinched and held between the punch end surface of the outer punch 23 and the end surface of the blank holder 25.

Further, the blank S is pinched between the intermediate punch and the frame portion 24B of the center die 24. The center punch 21 is moved further down relative to the intermediate punch 22 and the outer punch 23 while the blank S is pinched between the outer punch 23 and the blank holder 25, and thus, the concave portion 4 is formed in the blank S by pressing (drawing) (see FIG. 6B).

On completion of the forming of the concave portion 4, the concave portion 4 of the blank S is pinched and held between the punch end surface of the center punch 21 and the concave portion 24A of the center die 24. In other words, on completion of the first intermediate pressing step, the blank S is pinched between the punches 21 to 23 and the center die 24 and the blank holder 25.

Next, the second intermediate pressing step is carried out to form the first vertical wall section 5A and the intermediate flange 7A, and, thereby, the intermediate formed product 1A is produced. Specifically, while the blank S is pinched between the center and intermediate punches 21 and 22 and the center die 24 and is pinched between the outer punch 23 and the blank holder 25, the outer punch 23 and the blank holder 25 are moved down relative to the center and the intermediate punches 21 and 22 and the center die 24 to press the blank S (see FIG. 6C). Thereby, the first vertical wall section 5A and the intermediate flange 7A are formed in the blank S, and the blank S is formed into the intermediate formed product 1A.

In the intermediate pressing step, the concave portion 4 is formed at the first intermediate pressing step, and the frame portion 3A, the first vertical wall section 5A and the intermediate flange 7A, which are to be positioned at the outer side of the concave portion 4, are formed at the second intermediate pressing step. If the first vertical wall section 5A and the intermediate flange 7A are formed before the forming of the concave portion 4, in the inner portion of the blank S than the first vertical wall section 5A, the material will be tense. If the center punch 21 is moved down while the material is tense, the amount of material to be drawn into the concave portion 24A of the center die 24 will be insufficient. This means that the amount of material for forming of the concave portion 4A is inadequate. This may cause variation of the concave portion 4 of the intermediate formed product 1 in plate thickness, and/or may cause cracks in the concave portion 4. In the intermediate pressing step according to the embodiment, the concave portion 4 is formed at the first intermediate pressing step, and thereafter, the frame portion 3, the first vertical wall section 5A and the intermediate flange 7A, which are to be positioned at the outer side of the concave portion 4, are formed at the second intermediate pressing step. In this case, in the intermediate pressing step, there is an adequate amount of material that can be drawn into the concave portion 24A of the center die 24. Therefore, the concave portion 24 is easily formed. After the forming of the concave portion 4 at the first intermediate pressing step, the blank S is pressed by the outer punch 23 and the blank holder 25 while the blank S with the concave portion 4 formed therein is pinched and held between the intermediate punch 22 and the center die 24, and thereby, the first vertical wall section 5A and the intermediate flange 7A are formed. Thus, the intermediate formed product 1 is produced. This process suppresses generation of wrinkles, cracks and other defects in the intermediate formed product 1A.

In FIG. 6A, when the center punch 21, the intermediate punch 22 and the outer punch 23 make contact with the upper surface of the blank S, the gap between the punch end surface of the intermediate punch 22 and the end surface of the frame portion 24B of the center die 24 and the gap between the punch end surface of the outer punch 23 and the end surface of the blank holder 25 are preferably of a size corresponding to the plate thickness of the blank S plus an additional space of about 0.1 mm (more specifically, for example, 0.05 to 0.3 mm). The gap size can be achieved in a structure as follows, for example. One or more spacers (not shown) are attached to a part of the outer edge of the frame portion 24B of the center die 24 and/or a part of the outer edge of the end surface of the blank holder 25. The spacers have a thickness corresponding to the gap size, and the spacers contact the punch end surface of the intermediate punch 22 and/or the punch end surface of the outer punch 23. Therefore, the blank S is pinched loosely and held in the gap between the punch end surface of the intermediate punch 22 and the end surface of the frame portion 24B of the center die 24 and between the punch end surface of the outer punch 23 and the end surface of the blank holder 25. Accordingly, in forming the concave portion 4 at the first intermediate pressing step, it is easy to draw the material into the concave portion 24A of the center die 24. The same applies to FIG. 6B. However, when the additional spaces increase the risk of causing wrinkles, it is not necessary to make the additional spaces, and a pinching force may be applied to the blank S within a degree not to cause wrinkles.

Second Embodiment

In the first embodiment, the first pressing step and the second pressing step are carried out by use of the same one intermediate pressing machine 20. However, different intermediate pressing machines (different dies) may be used in the first intermediate pressing step and in the second intermediate pressing step to form the blank S into the intermediate formed product 1. The intermediate pressing step according to the second embodiment in which two intermediate pressing machines are used will hereinafter be described.

The intermediate pressing step according to the second embodiment, as in the first embodiment, includes a first intermediate pressing step and a second intermediate pressing step.

Figure 7A:
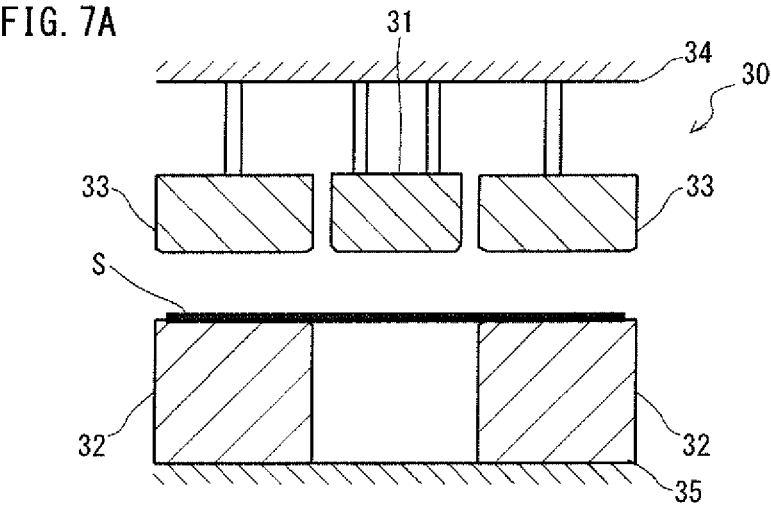
FIG. 7A is a schematic view showing a step of a first intermediate pressing step which is different from the intermediate pressing step shown in FIGS. 6A to 6C.

FIG. 7A is a schematic view of a first intermediate pressing machine 30 used in the first intermediate pressing step. In reference to FIG. 7A, the first intermediate pressing machine 30 is a standard pressing machine. The first intermediate pressing machine 30 includes a center punch 31 and a blank holder 32 as upper dies, and includes a die 32 as a lower die.

The punch end surface of the center punch 31 has a shape corresponding to the bottom face 4A of the concave portion 4 of the top board 2 of the intermediate formed product 1A. The part of the punch side surface of the center punch 31 adjacent to the punch end surface has a shape corresponding to the side surface 4B of the concave portion 4 of the top board 2.

The blank holder 33 is located at the outer side of the center punch 31 and adjacent to the center punch 31. The center punch 31 and the blank holder 33 are supported by an upper holder 34. A pressing member (not shown) is disposed between the blank holder 33 and the upper holder 34, and the blank holder 33 is supported by the upper holder 34 via the pressing member in such a way as to be movable up and down relative to the center punch 31. The pressing member is of the same type as the pressing members provided in the intermediate pressing machine 20 according to the first embodiment.

The upper holder 34 is fastened to a lifting and lowering device (slides) (not shown). The center punch 31 and the blank holder 33 may be fastened to different slides which are movable up and down independently of each other.

The die 32 has an opening in the end surface, in a portion facing the end surface of the center punch 31. The end surface of the die 32 except for the opening faces the end surface of the blank holder 33. The die 32 is supported by a lower holder 35.

In the intermediate pressing step according to the second embodiment, first, a blank S is placed on the end surface of the die 32 of the first intermediate pressing machine 30 (blank placing step). In this regard, the blank S is placed between the center punch 31 and the blank holder 33, and the die 32.

At the time, for example, the end surface of the center punch 31 and the end surface of the blank holder 33 is substantially on the same level with each other. In other words, the end surface of the center punch 31 and the end surface of the blank holder 33 are substantially at the same height with each other.

Next, the first intermediate pressing step is carried out. The upper holder 34 is lowered by the slide (not shown). The upper holder 34 is lowered, and the end surface of the center punch 31 and the end surface of the blank holder 33 are brought into contact with the blank S (see FIG. 7B). Then, the blank S is pinched between the blank holder 33 and the die 32.

After the blank S has been pinched between the blank holder 33 and the die 32, the upper holder 34 is moved further down relative to the blank holder 33. Then, while the blank holder 33 is holding the blank S, the center punch 31 is moved further down onto the blank S to form the concave portion 4 (see FIG. 7C). In the first intermediate pressing step according to the second embodiment, the blank S is pressed by the above-described conventional method. Any detailed description of the motions of the die 32 and the blank holder 33 are not given.

After the concave portion 4 is formed in the blank S at the first intermediate pressing step, the second intermediate pressing step is carried out. FIGS. 8A to 8C are sectional views showing the second intermediate pressing step according to the second embodiment. FIG. 8A shows a step of placing the blank S with the concave portion 4 in a second intermediate pressing machine 40. FIG. 8B shows a step of pinching the blank S with the concave portion 4. FIG. 8C shows a step of forming the intermediate formed product 1A.

In reference to FIG. 8A, the second intermediate pressing machine 40 includes a center punch 41 and an outer punch 42 as upper dies, and includes a center die 43 and a blank holder 44 as lower dies.

The punch end surface of the center punch 41 has a shape corresponding to the shape of the top board 2 (the concave portion 4 and the frame portion 3) of the intermediate formed product 1A. The outer punch 42 is located at the outer side of the center punch 41 and adjacent to the center punch 41. There is a clearance between the outer punch 42 and the center punch 41. In this example, the end surface of the outer punch 42 is flat.

The end surface of the center die 43 has a shape corresponding to the shape of the top board 2 (the concave portion 4 and the frame portion 3) of the intermediate formed product 1A, and the part of the side surface of the center die 43 connecting to the end surface has a shape corresponding to the first vertical wall section 5A of the intermediate formed product 1A. The end surface of the center die 43 faces the punch end surface of the center punch 41. The blank holder 44 is located at the outer side of the center die 43 and adjacent to the center die 43. There is a clearance between the blank holder 44 and the center die 43. In this example, the end surface of the blank holder 44 is flat and the end surface faces the end surface of the outer punch 42.

As shown in FIG. 8A, the center punch 41 and the outer punch 42 are supported by an upper holder 45. A pressing member (not shown) is disposed between the center punch 41 and the upper holder 45. The pressing member is of the same type as the pressing members in the first embodiment. The center punch 41 is supported by the upper holder 45 in such a way as to be movable up and down relative to the outer punch 42. The upper holder 45 is fastened to a lifting and lowering device (slide) (not shown).

The center die 43 and the blank holder 44 are supported by a lower holder 46. A pressing member (not shown) is disposed between the blank holder 44 and the lower holder 46. The blank holder 44 is supported by the lower holder 46 in such a way as to be movable up and down relative to the center die 43.

The structure of the second intermediate pressing machine 40 is not limited to that shown in FIG. 8A. In the second intermediate pressing machine 40, for example, the center punch 41 and the outer punch 42 may be fastened to different slides which are movable up and down independently of each other.

As shown in FIG. 8A, the blank S with the concave portion 4 is placed on the center die 43 and the blank holder 44 of the second intermediate pressing machine 40. In this regard, the concave portion 4 that was formed in the blank S at the first intermediate pressing step is brought into contact with the part of the end surface of the center die 43 corresponding to the concave portion 4. The part of the end surface of the center die 43 corresponding to the frame portion 3 and the end surface of the blank holder 44 are substantially on the same level and substantially at the same height with each other. Therefore, any other portion of the blank S after subjected to the first intermediate pressing step than the concave portion 4 is in contact with the portion of the end surface of the center die 43 corresponding to the frame portion 3 and the end surface of the blank holder 44. Meanwhile, the part of the end surface of the center punch 41 corresponding to the frame portion 3 and the end surface of the outer punch 42 are substantially on the same level and substantially at the same height with each other.

After the blank S with the concave portion 4 is placed on the center die 43 and the blank holder 44, the upper holder 45 is lowered. Consequently, as shown in FIG. 8B, the punch end surface of the center punch 41 and the punch end surface of the outer punch 42 are brought into contact with the blank S. Thereby, the portions of the blank S corresponding to the concave portion 4 and the frame portion 3 are pinched between the center punch 41 and the center die 43, and the other portion of the blank S is pinched between the outer punch 42 and the blank holder 44.

Thereafter, the upper holder 45 is moved further down. In this regard, while the portions of the blank S corresponding to the concave portion 4 and the frame portion 3 are kept pinched between the center punch 41 and the center die 43 and while the other portion of the blank S is kept pinched between the outer punch 42 and the blank holder 44, the outer punch 42 and the blank holder 44 are moved down relative to the center punch 41 and the center die 43. Thereby, the blank S is pressed for forming of the first vertical wall section 5A and the intermediate flange 7A, and the intermediate formed product 1A is produced (see FIG. 8C). Thus, while the concave portion 4 and the frame portion 3 of the blank S are held, pressing for forming of the first vertical wall section 5A and the intermediate flange 7A is carried out.

In the second embodiment also, first the concave portion 4 is formed in the blank 5, and thereafter, the frame portion 3, the first vertical wall section 5A and the intermediate flange 7A, which are at the outer side of the concave portion 4, are formed. For the same reason as described in connection with the first embodiment, the intermediate formed product 1A is unlikely to have wrinkles, cracks and other defects.

Figure 7B:
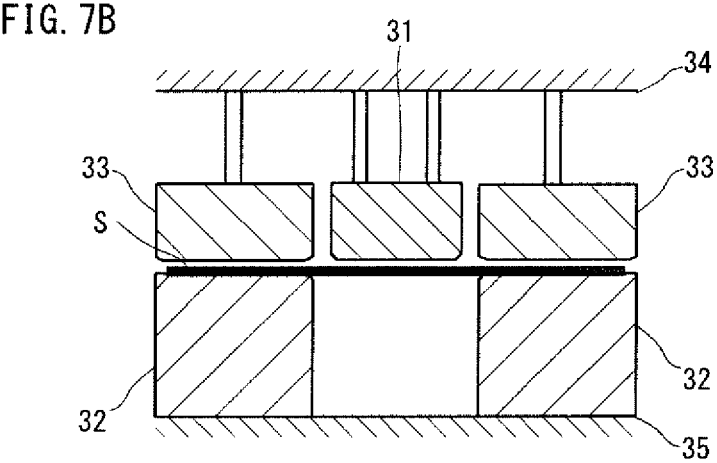
FIG. 7B is a schematic view showing a step subsequent to the step shown in FIG. 7A.
Figure 7C:
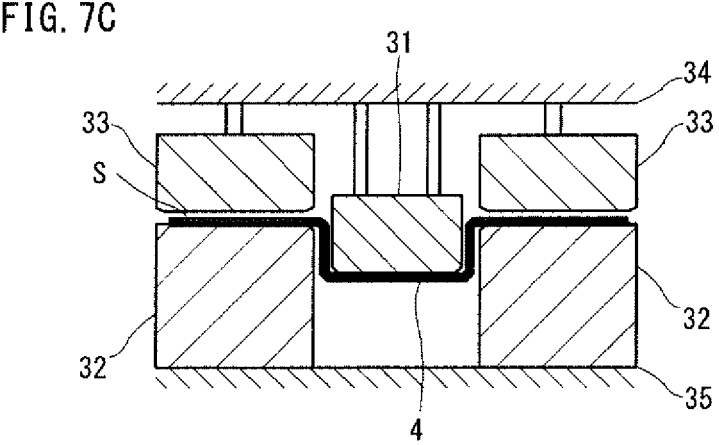
FIG. 7C is a schematic view showing a step subsequent to the step shown in FIG. 7B.

In FIG. 7B, when the end surface of the center punch 31 and the end surface of the blank holder 33 make contact with the blank S, the gap between the end surface of the blank holder 33 and the end surface of the die 32 is preferably of a size corresponding to the plate thickness of the blank S plus an additional space of about 0.1 mm (more specifically, for example, 0.05 to 0.3 mm). The gap size can be achieved in a structure as follows, for example. A spacer (not shown) is attached to a part of the outer edge of the end portion of the die 32. The spacer has a thickness corresponding to the gap size, and the spacer contacts the blank holder 33. Therefore, the blank S is pinched loosely and held in the gap between the die 32 and the blank holder 33. However, when the additional space increases the risk of causing wrinkles, it is not necessary to make the additional space, and a pinching force may be applied to the blank S within a degree not to cause wrinkles.

Likewise, in FIG. 8B, when the end surface of the center punch 41 and the end surface of the outer punch 42 make contact with the blank S, the gap between the end surface of the outer punch 42 and the end surface of the blank holder 44 is preferably of a size corresponding to the plate thickness of the blank S plus an additional space of about 0.1 mm (more specifically, for example, 0.05 to 0.3 mm). The gap size can be achieved in a structure as follows, for example. A spacer (not shown) is attached to a part of the outer edge of the end surface of the blank holder 44. The spacer has a thickness corresponding to the gap size, and the spacer contacts the outer punch 42. Therefore, the blank S is pinched loosely and held in the gap between the outer punch 42 and the blank holder 44.

The intermediate pressing step may be carried out as cold pressing or warm pressing. Here, cold pressing means pressing at room temperature (around 25° C.). Hot pressing means pressing at a temperature of 100° C. to not more than the transformation point $A_1$ of the material of the blank S. Alternatively, the blank S may be heated to the transformation point $A_1$ or higher, and then, the intermediate pressing step may be carried out as hot pressing. Here, hot pressing means pressing at a temperature equal to or higher than the transformation point $A_1$.

[Heating Step and Final Pressing Step]

The intermediate formed product 1A produced in the intermediate pressing step is heated in the heating step. The heated intermediate formed product 1A is pressed and quenched (that is, hot stamped) by use of a final pressing machine, and thereby, the panel-like formed product 1 is produced. The heating step and the final pressing step will be described in detail below.

[Heating Step]

Figure 9:
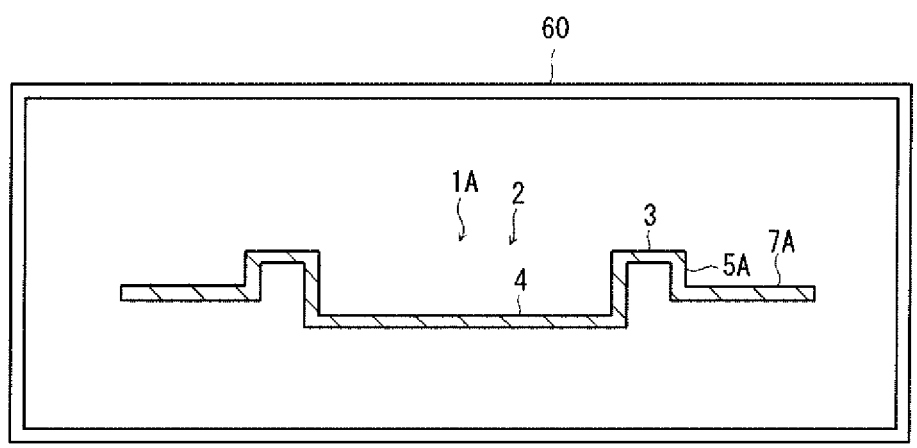
FIG. 9 is a schematic view of a heating step carried out after the intermediate pressing step.

In the heating step, the intermediate formed product 1A is heated by use of a heating device. For example, as shown in FIG. 9, the intermediate formed product 1A is put into a batch-type heating furnace 60 and heated therein. In the heating step, the intermediate formed product 1A is desirably heated at a temperature equal to or higher than the transformation point $A_1$ of the material steel plate of the intermediate formed product 1A, and more desirably, the intermediate formed product 1A is heated to a temperature equal to or higher than the transformation point $A_3$ of the material steel plate. The heating temperature is desirably not lower than 700° C., and more desirably not lower than 900° C. The heating temperature is desirably not higher than 980° C. The heating may be performed by electrification instead of using the batch-type heating furnace.

When the intermediate formed product 1A is heated at a temperature equal to or higher than the transformation point $A_1$, the microstructure after subjected to hot stamping (quenching), which will be described later, will include martensite. Accordingly, the panel-like formed product will have higher strength. The heating temperature is adjusted appropriately according to the kind, the degree of difficulty in being formed, and the like of the material steel. After the heating, the intermediate formed product 1A is taken out of the heating furnace 60, and is subjected to hot stamping.

[Final Pressing Step]

In this example, in the final pressing step, the heated intermediate formed product 1A is hot stamped by use of a final pressing machine. Thereby, the panel-like formed product 1 to be typically used as a door inner panel is produced.

The hot stamping is pressing the heated intermediate formed product 1A and quenching the heated intermediate formed product 1A by rapidly cooling it. The hot stamping introduces martensite in the microstructure of the panel-like formed product 1 made of a steel plate and thereby allows the panel-like formed product 1 to have higher strength.

[Final Pressing Machine]

Figure 10A:
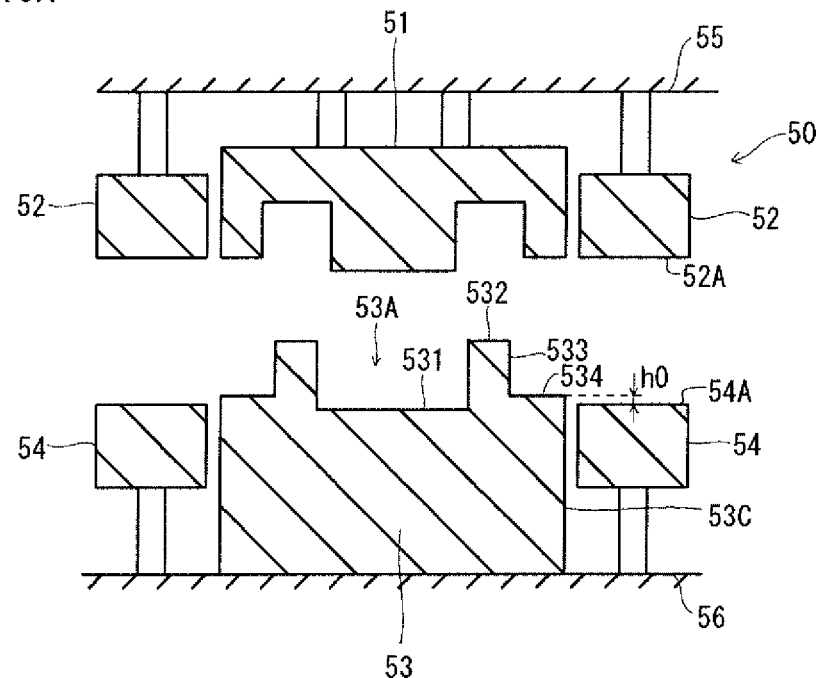
FIG. 10A is a schematic view of a final pressing machine used in a final pressing step.
Figure 10B:
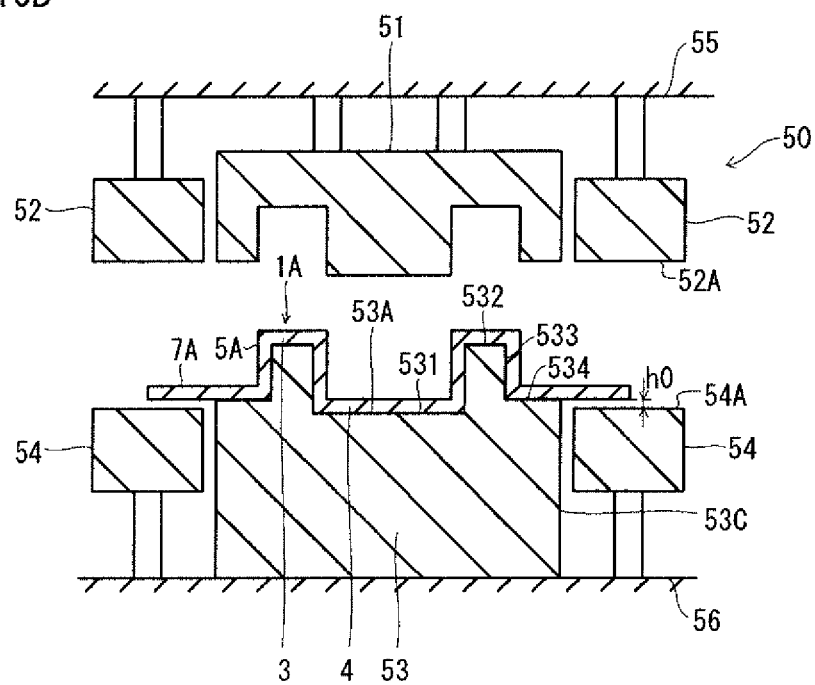
FIG. 10B is a schematic view showing a step of the final pressing step carried out after the heating step shown in FIG. 9.

FIG. 10A is a schematic view of a final pressing machine 50 used in the final pressing step. In reference to FIG. 10A, the final pressing machine 50 includes a center punch 51 and an outer punch 52 as upper dies, and includes a center die 53 and a blank holder 54 as lower dies.

The punch end surface of the center punch 51 has a shape corresponding to the top board 2 (the concave portion 4 and the frame portion 3) of the panel-like formed product 1, and the part of the side surface thereof adjacent to the punch end surface has a shape corresponding to the first vertical wall section 5A. The outer punch 52 is located at the outer side of the center punch 51 and adjacent to the center punch 51. There is a clearance between the outer punch 52 and the center punch 51. In this example, the end surface of the outer punch 52A is substantially flat and faces the end surface 54A of the blank holder 54.

The center die 53 includes an end surface 53A and a side surface 53C. The end surface 53A includes a concave portion 531, an edge portion 532, a vertical wall portion 533, and a stair portion 534. The concave portion 531 has a shape corresponding to the shape of the concave portion 4 of the panel-like formed product 1. The edge portion 532 is positioned at the outer side of the concave portion 531 and adjacent to the concave portion 531. The edge portion 532 connects to the concave portion 531. The edge portion 532 has a shape corresponding to the frame portion 3 of the panel-like formed product 1. The vertical wall portion 533 extends downward from the edge portion 532. The vertical wall portion 533 has a shape corresponding to the first vertical wall section 5A of the panel-like formed product 1. The stair portion 534 is positioned at the outer side of the vertical wall portion 533 and connects to the lower end of the vertical wall portion 533. The stair portion 534 has a shape corresponding to the stair 6 of the panel-like formed product 1. Accordingly, the height difference between the stair portion 534 and the edge portion 532 corresponds to the height H1 of the stair of the panel-like formed product 1.

The side surface 53C extends from the outer edge of the stair portion 534 down toward the lower end of the final pressing machine 50. The side surface 53C has a shape corresponding to the shape of the second vertical wall section 5B of the panel-like formed product 1. The end surface 53A of the center die 53 faces the end surface of the center punch 51.

The blank holder 54 is located at the outer side of the center die 53 and adjacent to the center die 53. There is a clearance between the blank holder 54 and the center die 53. The end surface 54A of the blank holder 54 is flat. The end surface 54A of the blank holder 54 faces the end surface 52A of the outer punch 52.

The center punch 51 and the outer punch 52 are supported by an upper holder 55. The center punch 51 is fastened to the upper holder 55 in such a way as to be movable up and down relative to the outer punch 52. For example, the center punch 51 is supported by the upper holder 55 via a pressing member (not shown). However, for example, the center punch 51 and the outer punch 52 may be fastened to the upper holder 55 in such a way as to be movable up and down independently of each other. The upper holder 55 is fastened to a lifting and lowering device (slide) (not shown) and is movable up and down.

The center die 53 and the blank holder 54 are supported by a lower holder 56. The blank holder 54 is supported by the lower holder 56 in such a way as to be movable up and down relative to the center die 53. For example, the blank holder 54 is supported by the lower holder 56 via a pressing member (not shown). However, for example, the center die 53 and the blank holder 54 may be fastened to the lower holder 56 in such a way as to be movable up and down independently of each other.

As shown in FIG. 10A, the initial height of the end surface 54A of the blank holder 54 is lower than the height of the stair portion 534 of the center die 53. For example, at an early stage (before pressing) of the final pressing step, as shown in FIG. 10A, there is an initial height difference h0 between the end surface 54A and the stair portion 534. The initial height difference h0 is, for example, 1.0 to 5.0 mm.

The final pressing step to be carried out by use of the final pressing machine 50 includes an early step and a late step as follows.

Early step: The intermediate formed product 1A is placed on the center die 53, and the intermediate formed product 1A is pinched between the center punch 51 and the center die 53 and further pinched between the outer punch 52 and the blank holder 54.

Late step: The outer punch 53 and the blank holder 54 with the intermediate formed product 1A pinched in between are moved relative to the center punch 51 and the center die 53 with the intermediate formed product 1A pinched in between, and thereby, the panel-like formed product 1 is produced.

By pinching the center portion of the intermediate formed product 1A between the center die 53 and the center punch 51 at the early step and by carrying out pressing at the late step by moving the outer punch 52 and the blank holder 54 with the intermediate formed product 1A pinched in between relative to the center die 53 and the center punch 51, it is possible to suppress generation of wrinkles in the panel-like formed product 1.

When hot stamping is carried out in the late step, the early step includes a first step and a second step as follows.

First step: The intermediate formed product 1A is positioned, the intermediate formed product 1A is pinched between the center punch 51 and the center die 53, and the outer punch 52 is brought into contact with the intermediate product 1A.

Second step: After the outer punch 52 is brought into contact with the intermediate formed product 1A, while the intermediate product 1A is kept pinched between the center punch 51 and the center die 53, the blank holder 54 is brought into contact with the intermediate formed product 1A, and thereby, the intermediate formed product 1A is pinched between the outer punch 52 and the blank holder 54.

By carrying out the first step and the second step, the blank holder 54 is prevented from contacting the intermediate formed product 1A until the outer punch 52 is brought into contact with the intermediate formed product 1A. This prevents the portion of the intermediate formed product 1A to be pressed at the late step from dropping in temperature before pressing starts in the late step. Accordingly, in the pressing in the late step, the intermediate formed product 1A can maintain sufficient hardenability while maintaining workability. The early step and the late step will be described below.

[Early Step]

In a case in which hot stamping is carried out in the final pressing step as in this example, the early step includes the first step and the second step.

[First Step]

In the first step, first, the intermediate formed product 1A which was heated in the heating step is placed on the center die 53 and the blank holder 54 of the final pressing machine 50 as shown in FIG. 10A.

When the intermediate formed product 1A is placed on the center die 53, the concave portion 531 of the end surface 53A of the center die 53 makes contact with the concave portion 4 of the intermediate formed product 1A, the edge portion 532 of the end surface 53A of the center die 53 makes contact with the frame portion 3 of the intermediate formed product 1A, and the vertical wall portion 533 of the end surface 53A of the center die 53 makes contact with the first vertical wall section 5A of the intermediate formed product 1A. The stair portion 534 of the end surface 53A of the center die 53 makes contact with the intermediate flange 7A of the intermediate formed product 1A.

Meanwhile, the end surface 54A of the blank holder 54 is located at a height that is lower than the stair portion 534 by the initial height difference h0. Therefore, when the intermediate formed product 1A is placed on the center die 53, the intermediate formed product 1A does not make contact with the blank holder 54.

After the intermediate formed product 1A is placed on the center die 53, the center punch 51 and the outer punch 52 are moved down. In this regard, while the portion of the end surface of the center punch 51 corresponding to the stair 6 of the panel-like formed product 1 is kept substantially at the same height as the end surface 52A of the outer punch 52, the center punch 51 and the outer punch 52 are moved down.

Figure 10C:
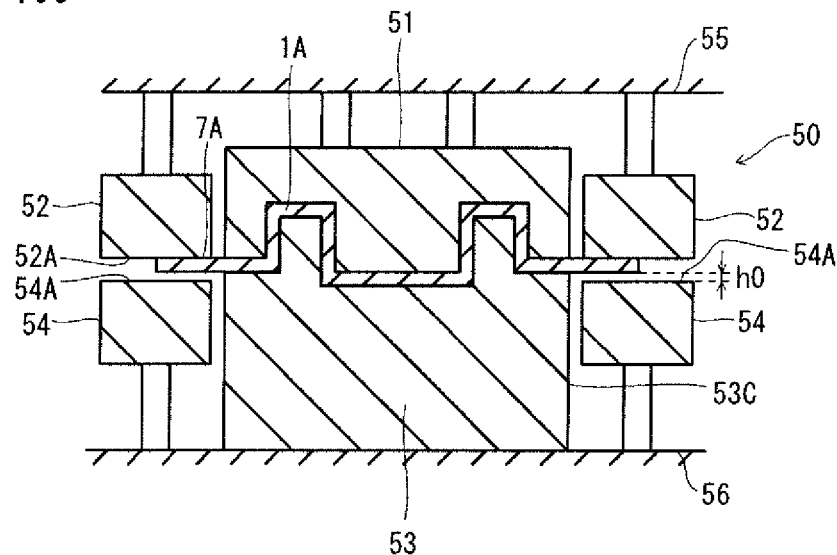
FIG. 10C is a schematic view showing a step subsequent to the step shown in FIG. 10B.

As the center punch 51 and the outer punch 53 are moved down, and as shown in FIG. 10C, the intermediate formed product 1A is pinched between the center punch 51 and the center die 53. Almost at the same time when the center punch 51 is brought into contact with the intermediate formed product 1A, the end surface 52A of the outer punch 52 is brought into contact with the intermediate formed product 1A (the intermediate flange 7A). At the time, as shown in FIG. 10C, the end surface 54A of the blank holder 54 is not in contact with the intermediate formed product 1A. Thus, in the first step, the intermediate formed product 1A is pinched between the center punch 51 and the center die 53, and the outer punch 52 is brought into contact with the intermediate formed product 1A with the blank holder 54 kept out of contact with the intermediate formed product 1A.

Since the intermediate flange 7A is out of contact with the end surface 54A of the blank holder 54 at the time, the intermediate flange 7A does not drop in temperature easily before pressing starts. Thus, it is possible to suppress a temperature drop of the intermediate formed product 1A before pressing and thereby to maintain good workability.

The initial height difference h0 is preferably 1.0 to 5.0 mm. The initial height difference h0 of not less than 1.0 mm secures a sufficient space between the blank holder 54 and the intermediate formed product 1A when the punch 52 is brought into contact with the intermediate product 1A. In this case, the end surface 54A of the blank holder 54 is not brought into contact with the intermediate formed product 1A until the end surface 52A of the outer punch 52 is brought into contact with the intermediate formed product 1A. Accordingly, a temperature drop of the intermediate formed product 1A can be suppressed sufficiently before pressing is performed by pinching the intermediate formed product 1A between the outer punch 52 and the blank holder 54. Consequently, lowering of the workability of the intermediate formed product 1A can be suppressed, and the intermediate formed product 1A can be quenched enough.

The initial height difference h0 of not more than 5.0 mm avoids making too large a space between the blank holder 54 and the intermediate formed product 1A and thereby secures an appropriate sized space therebetween. This shortens the time period from the time when the outer punch 52 is brought into contact with the intermediate formed product 1A till the time when the intermediate formed product 1A is brought into contact with the blank holder 54, which leads to further suppression of generation of wrinkles and the like during pressing.

The initial height difference h0 is not limited to 1.0 to 5.0 min. There is no particular limit to the initial height difference h0 as long as it prevents the end surface 54A of the blank holder 54 from making contact with the intermediate formed product 1A when the end surface 52A of the outer punch 52 is brought into contact with the intermediate formed product 1A as shown in FIG. 10C.

[Second Step]

Figure 10D:
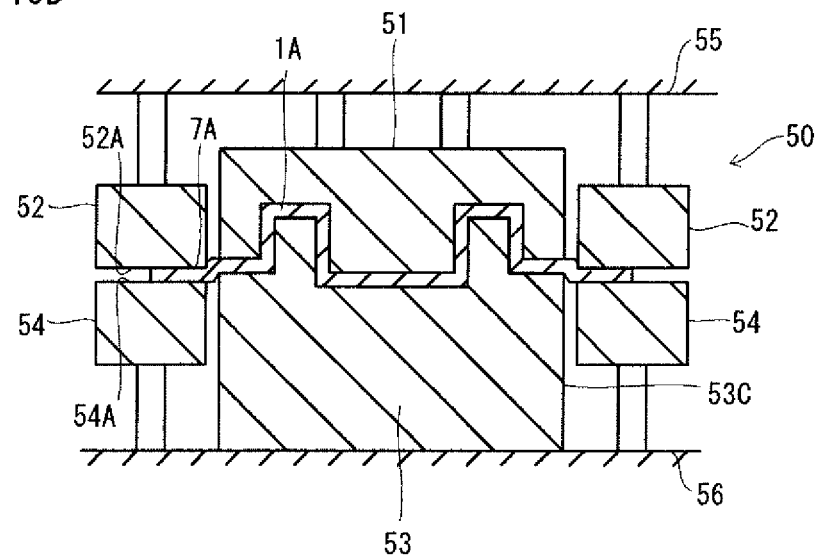
FIG. 10D is a schematic view showing a step subsequent to the step shown in FIG. 10C.

The intermediate formed product 1A is pinched between the center punch 51 and the center die 53, and the outer punch 52 is brought into contact with the intermediate formed product 1A. Thereafter, in the second step, while the intermediate formed product 1A is kept pinched between the center punch 51 and the center die 53, the blank holder 54 is further brought into contact with the intermediate formed product 1A, and thereby, the intermediate formed product 1A is pinched between the outer punch 52 and the blank holder 54 (see FIG. 10D).

In this example, after the outer punch 52 is brought into contact with the intermediate formed product 1A, the outer punch 52 is moved down relative to the center punch 51 while the intermediate formed product 1A is kept pinched between the center punch 51 and the center die 53. Thereby, the intermediate flange 7A of the intermediate formed product 1A is slightly deformed, and the intermediate flange 7A makes contact with the end surface 54A of the blank holder 54 while being in contact with the end surface 52A of the outer punch 52. Then, the intermediate formed product 1A (the intermediate flange 7A) is pinched between the outer punch 52 and the blank holder 54.

As described above, the blank holder 54 is not brought into contact with the intermediate formed product 1A until the outer punch 52 is brought into contact with the intermediate product 1A. In other words, after the outer punch 52 is brought into contact with the intermediate formed product 1A (for example, when the outer punch 52 is moved further down by 1.0 to 5.0 mm after being brought into contact with the flange 7A of the intermediate formed product 1A), the blank holder 54 makes contact with the intermediate flange 7A of the intermediate formed product 1A. Thus, while the intermediate formed product 1A is kept pinched between the center punch 51 and the center die 53, the intermediate formed product 1A is pinched between the outer punch 52 and the blank holder 54.

[Late Step]

Figure 10E:
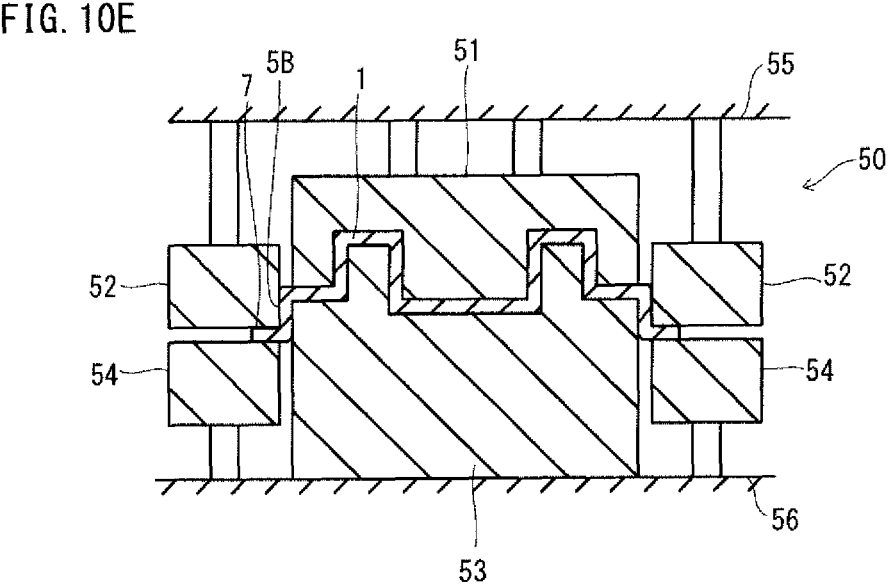
FIG. 10E is a schematic view showing a step subsequent to the step shown in FIG. 10D.

After the intermediate flange 7A of the intermediate formed product 1A is pinched between the outer punch 52 and the blank holder 54 at the early step (the second step), the outer punch 52 and the blank holder 54 with the intermediate formed product 1A pinched in between are moved down relative to the center punch 51 and the center die 53 with the intermediate formed product 1A pinched in between. Thereby, as shown in FIG. 10E, the second vertical wall section 5B and the flange 7 are formed, and the panel-like formed product 1 is produced. In this example, the outer punch 52 and the blank holder 54 with the intermediate formed product 1A pinched in between are moved further down, and pressing (hot stamping) is carried out. When the outer punch 52 is moved down by a distance corresponding to the height of the second vertical wall section 5B of the panel-like formed product 1 after making contact with the intermediate flange 7A, the downward motion of the outer punch 52 is stopped. In this way, the panel-like formed product 1 is produced.

Water or any other cooling medium is circulated in the center punch 51, the outer punch 52, the center die 53 and the blank holder 54. Therefore, the intermediate formed product 1A undergoing pressing is rapidly cooled. Thus, in the final pressing step, the intermediate formed product 1A is pressed and in the meantime, rapidly cooled (quenched).

As described above, in the final pressing step, the intermediate formed product 1A is pressed and in the meantime, quenched. This allows the panel-formed product 1 to have a microstructure including martensite. Accordingly, the thus manufactured panel-like formed product 1 has high strength.

In the embodiment, in the early step, first, the outer punch 52 is brought into contact with the intermediate formed product 1A (first step), and thereafter, the blank holder 54 is brought into contact with the intermediate formed product 1A (second step). If the end surface 54A of the blank holder 54 is at the same height as the stair portion 534 of the center die 53, when the intermediate formed product 1A is placed on the center die 53, the intermediate flange 7A to be pressed will make contact with the blank holder 54. In this case, the temperature of the intermediate flange 7A will become lower before the outer punch 52 is brought into contact with the flange 7A. This makes the pressing difficult. Also, this makes it difficult to perform the quenching sufficiently.

In the embodiment, on the other hand, when the intermediate formed product 1A is placed on the center die 53, the blank holder 54 does not make contact with the intermediate formed product 1A. After the intermediate formed product 1A is pinched between the center punch 51 and the center die 53, and after the outer punch 53 is brought into contact with the intermediate flange 7A of the intermediate formed product 1A, the blank holder 54 is brought into contact with the intermediate flange 7A. This prevents the intermediate flange 7A of the intermediate formed product 1A from dropping in temperature before being pressed by the outer punch 52 and the blank holder 54. This reduces a risk of a decrease in workability of the intermediate formed product 1A caused by a temperature drop of the intermediate flange 7A, which allows the quenching to be performed sufficiently.

In a state in which the intermediate flange 7A of the intermediate formed product 1A is pinched between the outer punch 52 and the blank holder 54, the gap between the end surface 52A of the outer punch 52 and the end surface 54A of the blank holder 54 is preferably of a size corresponding to the plate thickness of the intermediate formed product 1A plus about 0.1 mm (for example, the plate thickness of the intermediate formed product 1A plus 0.05 to 0.3 mm).

For example, a spacer (not shown) is attached to a part of the outer edge of the end surface 54A of the blank holder 54. The spacer has a thickness corresponding to the plate thickness of the intermediate formed product 1A plus about 0.1 mm (for example, 0.05 to 0.3 mm). Accordingly, when the intermediate formed product 1A is pinched between the outer punch 52 and the blank holder 54, the outer punch 52 is brought into contact with the spacer attached to the blank holder 54. Then, the gap between the outer punch 52 and the blank holder 54 is of the size above. In this case, the intermediate formed product 1A is pinched between the outer punch 52 and the blank holder 54 loosely. Therefore, the intermediate formed product 1A is not held too tight, and the material is easily drawn as the intermediate formed product 1A is being deformed. Thus, the pressing is performed smoothly.

Further, when the stair 6, the second vertical wall section 5B and the flange 7 are to be formed by hot stamping, the top board 2 of the intermediate formed product 1A and the portion of the intermediate flange 7A to be formed into the stair 6 are pinched and held between the center punch 51 and the center die 53. This suppresses generation of wrinkles and other defects in the panel-like formed product 1. This point will be described below.

[Suppression of Generation of Cracks and Wrinkles]

Figure 11:
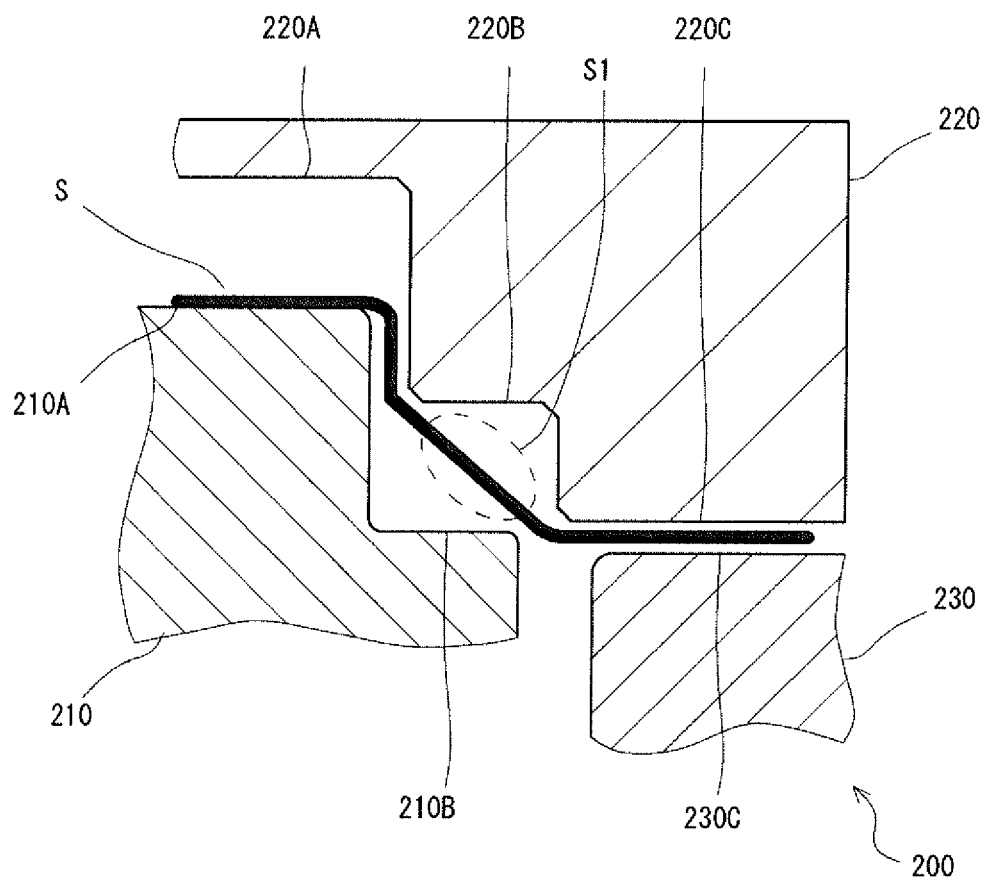
FIG. 11 is a schematic view showing how wrinkles and the like are generated during press working.

FIG. 11 is a sectional view showing pressing by use of a conventional final pressing machine. FIG. 11 enlarges a stair-like portion of a punch of the conventional final pressing machine. In the conventional final pressing machine 200, a punch 220 has a stair surface 220B and a reference surface 220C which are integrally formed. Therefore, during pressing, before the end surface 220A and the stair surface 220B of the punch 220 reach the end surface 210A and the stair surface 210B of the die 210, the reference surface 220C of the punch 220 reaches the end surface 230C of the blank holder 230. At the time, a portion S1 of the blank S to be pressed by the stair surface 220B of the punch 220 is not held. In other words, the portion S1 of the blank S is neither in contact with the die 210 nor in contact with the punch 220.

As shown in FIG. 11, while the die 210 and the punch 220 are processing the blank S, the blank S is pulled toward the end surface 220A of the punch 200. Therefore, the material of the blank S is likely to flow from the portion to be pinched between the blank holder 230 and the punch 220 to the portion S1. When the portion S1 is pressed with the material flowing thereinto, wrinkles are likely to be generated in the portion S1. This is because of excess material that flowed into and present in the portion S1. During the pressing, the portion S1 is not held and accordingly is under tension. When the portion S1 under tension is pressed, cracks are likely to be generated in the portion S1. Especially when the plate thickness of the blank S is thin, cracks are more likely to be generated.

In view of this, according to the embodiment, the pressing step is divided into an intermediate pressing step and a final pressing step. In the intermediate pressing step, an intermediate formed product 1A with the same shape as the panel-like formed product 1 in the portion up to the stair 6 is produced. Then, in the final pressing step, while the concave portion 4, the frame portion 3, the first vertical wall section 5A and the portion corresponding to the stair 6 of the intermediate formed product 1A are pinched and held, the intermediate flange 7A of the intermediate formed product 1A is pinched and pressed by the outer punch 52 and the blank holder 54. In this regard, in the portion of the intermediate formed product 1A to be pressed, a free portion which is not held (a portion like the portion S1 shown in FIG. 11) is very small. Therefore, generation of cracks and wrinkles is suppressed.

The effect to suppress generation of wrinkles and cracks brought by performing pressing in two stages, namely, the intermediate pressing step and the final pressing step is obtained both in a case in which hot stamping is performed in the final pressing step and in a case in which cold pressing is performed with the heating step not performed in the final pressing step as will be described below.

In the case in which hot stamping is performed in the final pressing step, the early step need not be divided into the first step and the second step. In other words, the blank holder 54 may be brought into contact with the intermediate formed product 1A before the outer punch 52 is brought into contact with the intermediate formed product 1A. Even in this case, since pressing is performed in two stages, namely, in the intermediate pressing step and the final pressing step, generation of wrinkles and the like can be suppressed. However, when hot stamping is performed in the final pressing step, it is preferred that the early step of the final pressing step is divided into the first step and the second step. In this case, the portion of the intermediate formed product 1A to be pressed in the final pressing step can be prevented from dropping in temperature, and this allows the intermediate formed product 1A to maintain sufficient workability and hardenability.

Regarding suppression of generation of cracks and wrinkles in the panel-like formed product 1, the same applies to the intermediate pressing step to form the blank S into the intermediate formed product 1A. In the intermediate pressing step, at the second intermediate pressing step to form the frame portion 3 and the first vertical wall section 5A in the blank S, the concave portion 4, which has been formed at the first intermediate pressing step, and the portion of the blank S to be formed into the frame portion 3 are held (see FIGS. 6B, 6C, 8B and 8C). Thus, at the second intermediate pressing step, a free portion like the portion S1 of the blank S shown in FIG. 11 is small. Accordingly, wrinkles and the like are unlikely to be generated in the intermediate formed product 1A.

As described above, in the intermediate pressing step, the intermediate formed product 1A may be formed by cold pressing. Even in the cold pressing, however, if a free portion like the portion S1 of the blank S shown in FIG. 11 is present at the time of pressing, wrinkles and the like are likely to be generated. In view of this, in the intermediate pressing step according to the embodiment, at the second intermediate pressing step, the frame portion 3 and the vertical wall 5A are formed while the concave portion 4 and the portion to be formed into the frame portion 3 are held. Thus, whether the intermediate pressing step is cold pressing, warm pressing or hot pressing, wrinkles and the like are unlikely to be generated in the intermediate formed product 1A.

In the case in which hot stamping is performed in the final pressing step, the blank S is cooled by contact with the punches, dies and blank holder. In the case in which hot stamping is performed by use of the conventional final pressing machine shown in FIG. 11, however, the portion S1 of the blank S is not cooled for the reason as described above. The portion S1 of the blank S is cooled when the punch 220 is moved further down from the position shown in FIG. 11. Thus, when a panel-like formed product with a stair in vertical walls is formed by use of a single-body punch 220, the portion S1 of the blank S is cooled later than the other portions as described above.

When a part of the blank S is cooled later, it causes variation of the blank S in strength and ductility. Therefore, in the case in which hot stamping is performed in the final pressing step, wrinkles are more likely to be generated in the panel-like formed product. As shown in FIG. 1, when the panel-like formed product 1 has a stair 6 in adjacent vertical walls 5 so as to be usable typically as a door inner panel, cracks, wrinkles and the like are especially likely to be generated.

According to the embodiment, on the other hand, while the portions of the intermediate formed product 1A corresponding to the concave portion 4, the frame portion 3, the first vertical wall section 5A and the stair 6 are pinched between the center punch 51 and the center die 53, pressing is carried out by pinching the intermediate flange 7A of the intermediate formed product 1A between the outer punch 52 and the blank holder 54. AT the time, in the portion of the intermediate formed product 1A to be pressed, a free portion which is not held is small. Therefore, even in the case in which hot stamping is performed in the final pressing step, generation of wrinkles and the like can be suppressed.

The above-described embodiments are cases in which the material of the panel-like formed product 1 is a steel plate. However, the present invention is applicable to a case of producing the panel-like formed product 1 from any other metal plate as well as a steel plate. The metal plate is, for example, an aluminum plate, an aluminum alloy plate, a multilayer steel plate, a titanium plate, a magnesium plate, or the like.

[Performing Cold Pressing Instead of Hot Stamping in Final Pressing Step]

In the embodiments above, in the final pressing step, a heating treatment is carried out, and hot stamping is performed. However, in the final pressing step of the production process, the intermediate formed product 1A may be cold pressed with the heating step omitted and thereby formed into the panel-like formed product 1. When a steel plate is used as the blank, the panel-like formed product 1 produced by cold pressing in the final pressing step preferably has a tensile strength of not less than 340 MPa. A case in which cold pressing is performed in the final pressing step will be described below.

In a case in which cold pressing is performed in the final pressing step, a final pressing machine having the same structure as the final pressing machine 50 shown in FIG. 10A is used. However, it is not necessary to circulate a cooling medium in the center punch 51, the outer punch 52, the center die 53 and the blank holder 54. Also, in the case of cold pressing, the end surface 54A of the blank holder 54 may be positioned at the same height as the stair portion 534 of the center die 53.

The method for manufacturing the panel-like formed product 1 by performing cold pressing by use of the final pressing machine having the structure shown in FIG. 10A includes a preparing step, an intermediate pressing step, and a final pressing step. Thus, in the case of cold pressing, the heating step is omitted as compared with the case in which hot stamping is performed.

The final pressing step includes an early step and a late step as follows.

Early step: The intermediate formed product 1A (at room temperature) is placed on the center die 53, and the intermediate formed product 1A is pinched between the center punch 52 and the center die 53 and further pinched between the outer punch 52 and the blank holder 54.

Late Step: The outer punch 52 and the blank holder 54 with the intermediate formed product 1A pinched in between is moved relative to the center punch 51 and the center die 53 with the intermediate formed product 1A pinched in between, and the panel-like formed product 1A is produced.

The respective steps will be described below.

[Early Step]

In the case in which the intermediate formed product 1A is formed into the panel-like formed product 1 by cold pressing, at the early step of the final pressing step, the intermediate formed product 1A is placed on the center die 53 and the blank holder 54. After the placement, the center punch 51 and the outer punch 52 are moved down. In this regard, while the portion of the end surface of the center punch 51 corresponding to the stair 6 of the panel-like formed product 1 is kept substantially at the same height as the end surface 52A of the outer punch 52, the center punch 51 and the outer punch 52 are moved down. Thereby, the intermediate formed product 1A is pinched between the center punch 51 and the center die 53, and the intermediate flange 7A of the intermediate formed product 1A is pinched between the outer punch 52 and the blank holder 54.

[Late Step]

After the early step, while the intermediate formed product 1A is kept pinched between the center punch 51 and the center die 53 and while the intermediate flange 7A of the intermediate formed product 1A is pinched between the outer punch 52 and the blank holder 54, the outer punch 52 and the blank holder 54 are moved further down. Thereby, the intermediate flange 7A is pressed into the second vertical wall section 5B and the flange 7B, and consequently, the panel-like formed product 1 is produced.

In the case in which cold pressing is performed instead of hot stamping, the early step need not be divided into the first step and the second step. The first step and the second step are to prevent the portion of the intermediate formed product 1A to be pressed (the outer portion of the intermediate formed product 1A) from dropping in temperature before undergoing hot stamping. In the case in which the intermediate formed product 1A is to be cold pressed without heated, the intermediate formed product 1A is not at high temperature, and the early step need not be divided into the first step and the second step.

As mentioned above, even in the case in which not hot stamping but cold pressing is performed in the final pressing step, since the intermediate pressing step and the final pressing step are carried out, generation of wrinkles and cracks in the panel-like formed product can be suppressed as in the case in which hot stamping is performed in the final pressing step.

In producing the panel-like formed product 1 as shown in FIG. 4, which includes a depression 11 and/or a projection in the concave portion 4, it is possible to form the depression 11 and/or the projection in the intermediate pressing step. Alternatively, an intermediate depression and/or an intermediate projection may be formed in the concave portion 4 in the intermediate pressing step, and thereafter, the intermediate depression and/or the intermediate projection mat be formed into the depression 11 and/or the projection in the final pressing step.

In any of the pressing machines (including the intermediate pressing machines 20, 30 and 40, and the final pressing machine 50), the arrangement of the punches, dies and blank holder is not limited to those shown in the drawings. In each of the pressing machines, the upper dies and the lower dies, which are composed of punches, dies, a blank holder, and the like, may be arranged upside down.

Examples

In order to confirm the effects of the manufacturing methods according to the embodiments, analysis was conducted by the FEM (finite element method). As an inventive example, it was assumed that the panel-like formed product 1 (door inner panel) shown in FIG. 1 was produced by the manufacturing method according to the first embodiment by use of the intermediate pressing machine 20 shown in FIG. 6 and the final pressing machine 50 shown in FIG. 10A. As a comparative example, meanwhile, it was assumed that a panel-like formed product (door inner panel) similar to the inventive example was produced by use of the conventional hot stamping machine shown in FIG. 11. The inventive example and the comparative example were analyzed in the following way, and the panel-like formed products were evaluated with respect to generation of wrinkles based on the analysis results.

[Analysis Condition]

As the material (as the intermediate formed product 1A in the inventive example and as the blank in the comparative example), a steel plate containing, at mass %, C: 0.21%, Si:

0.25%, Mn: 1.20%, B: 0.0020% and containing iron and impurities as the balance was used. The plate thickness of the blank was 1.2 mm. The blank after quenching had the following material characteristics; a Vickers hardness of 448; a yield strength of 448 MPa; a tensile strength of 1501 MPa; and a breaking elongation of 6.4%. The material was heated to 750° C. In the hot stamping, the die was moved at a speed equivalent to 40 m/s. In the hot stamping, the coefficient of friction between the die and the material was 0.4. A temperature-forming interaction analysis was performed by use of general-purpose FEM analysis software (LS-DYNA (tradename) manufactured by LIVERMORE SOFTWARE TECHNOLOGY).

Each of the panel-like formed products of the inventive example and the comparative example, which are to be used as door inner panels, had the following dimensions.

Entire length (including a flange): 950 mm
Entire width (including a flange): 670 mm
Entire length of the top board: 830 mm
Entire width of the top board: 600 mm
Height of the first vertical wall section: 40 mm
Height of the second vertical wall section: 40 mm
Minimum width of the stair: 40 mm In the hot stamping of the inventive example, the initial height of the end surface 54A of the blank holder 54 was 3.0 mm lower than the initial height of the stair portion 534 of the center die 53. Therefore, in the inventive example, when the second die was moved down by 3.0 mm after the center punch 51 and the outer punch 52 had made contact with the intermediate formed product, the blank holder 54 made contact with the intermediate formed product 1A.

[Evaluation Method]

About each of the panel-like formed product of the inventive example and the comparative example, the curvature of a concavity or convexity on the surface of the stair 6 was examined. The curvature was calculated as follows.

$$(\text{Curvature}[1/m]) = (1/(\text{radius of curvature}))$$

Sections of each of the panel-like formed products along lines perpendicular to the surface of the stair 6 were obtained, and in each of the sections, the curvature radii of the respective concavities and convexities on the surface of the stair 6 were calculated. The minimum value among the results was adopted as the radius of curvature in the above formula. Then, when the curvature was equal to or more than 0.01, the panel-like formed product was evaluated as having wrinkles.

[Analysis Results]

In the inventive example, there were no sections in which the curvature was 0.01 or more. Accordingly, the inventive example was evaluated as having no wrinkles. In the comparative example, on the other hand, there were many sections in which the curvature was 0.01 or more. Accordingly, the comparative example was evaluated as having wrinkles.

Some embodiments of the present invention have been described above. However, the above-described embodiments are merely examples to show how to carry out the present invention. Therefore, the present invention should not be limited to the embodiments above, and it is possible to modify the embodiments appropriately without departing from the spirit and scope of the present invention.

LIST OF REFERENCE SYMBOLS 1, 10: panel-like formed product
1A: intermediate formed product
2: top board
3: frame portion
4: concave portion
5: vertical wall
6: stair
7: flange
8: window member
50: final pressing machine

The invention claimed is:

1. A panel-like formed product made of a metal plate, the panel-like formed product comprising:
a polygonal top board,
two or more vertical walls extending from two or more sides of the top board among all sides of the top board defining an outer edge of the top board, the vertical walls including at least two adjacent vertical walls extending from at least two adjacent sides of the top board; and
a flange connecting to lower ends of the vertical walls and spreading in directions in which the top board spreads;
wherein:
the top board includes:
a frame portion including the two or more sides of the top board from which the vertical walls extend; and
a concave portion which is located at an inner side of the frame portion and recedes from the frame portion;
the at least two adjacent vertical walls include:
a first vertical wall section;
a stair connecting to a lower end of the first vertical wall section and spreading in the directions in which the top board spreads; and
a second vertical wall section connecting to an outer edge of the stair and extending in a direction in which the first vertical wall section extends; and
the flange connects to a lower end of the second vertical wall section;
the panel-like formed product is to be used as a door inner panel of a vehicle; and
none of the vertical walls and the frame portion extends from a side to be positioned at an upper side in the vehicle, among all sides of the top board defining the outer edge of the top board.

2. The panel-like formed product according to claim 1, wherein the frame portion has a width W (mm) which satisfies a condition expressed by formula (1), in which L denotes a maximum width (mm) of the top board.

$$10 < W < 0.2 \times L \tag{1}$$

3. The panel-like formed product according to claim 1, wherein a distance between the frame portion and a bottom face of the concave portion is greater than a distance between the frame portion and the stair.

4. The panel-like formed product according to claim 1, wherein the metal plate is a steel plate having a tensile strength of not less than 340 MPa.

5. The panel-like formed product according to claim 4, wherein the metal plate is a steel plate having a tensile strength of not less than 600 MPa.

6. The panel-like formed product according to claim 1, wherein the concave portion of the top board further includes either a linear depression depressed into a bottom face of the concave portion or a projection projecting from the bottom face of the concave portion, or both.

7. The panel-like formed product according to claim 1, wherein the metal plate is a tailored blank.

8. A vehicle door to be used in a vehicle, comprising:
the panel-like formed product according to claim 1;
a door outer panel located in an outer portion of the vehicle, at an outer side of the panel-like formed product, and joined with the panel-like formed product; and
a window member capable of being housed in the concave portion, the window member being located in an inner portion of the vehicle, at an inner side of the panel-like formed product.

* * * * *